(12) United States Patent
Lindberg

(10) Patent No.: US 6,366,579 B1
(45) Date of Patent: Apr. 2, 2002

(54) MODULAR TIME-SPACE SWITCH

(75) Inventor: Mikael Lindberg, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/141,150

(22) Filed: Aug. 27, 1998

(30) Foreign Application Priority Data

Aug. 28, 1997 (SE) ............................................. 9703105

(51) Int. Cl.⁷ ........................ H04Q 11/04; H04L 12/50
(52) U.S. Cl. ..................... 370/369; 370/370; 370/386
(58) Field of Search ............................... 370/357, 360, 370/369, 370, 372, 376, 380, 386; 340/2.1, 2.2, 2.28

(56) References Cited

U.S. PATENT DOCUMENTS

| | | | | |
|---|---|---|---|---|
| 4,114,143 A | * | 9/1978 | Karnaugh | 340/166 R |
| 4,524,442 A | | 6/1985 | Simmons et al. | 370/63 |
| 4,797,589 A | | 1/1989 | Collins | 370/63 |
| 5,617,414 A | * | 4/1997 | Bergkvist et al. | 370/374 |
| 5,784,369 A | * | 7/1998 | Romiti et al. | 370/358 |
| 6,088,329 A | * | 7/2000 | Lindberg et al. | 370/217 |

FOREIGN PATENT DOCUMENTS

| | | |
|---|---|---|
| EP | 0 558 291 | 9/1993 |
| WO | 92/16079 | 9/1992 |
| WO | 93/22858 | 11/1993 |
| WO | 95/32599 | 11/1995 |
| WO | 95/33354 | 12/1995 |

* cited by examiner

Primary Examiner—Alpus H. Hsu
(74) Attorney, Agent, or Firm—Burns, Doane, Swecker & Mathis, L.L.P.

(57) ABSTRACT

In a switch structure for circuit switching, part of the space switch functionality of a time-space (TS) switch core is broken out and arranged in groups of switch adapter boards, and the TS-switch core itself is divided into a matrix of smaller and independent TS-modules that are associated with the switch adapter boards. Each group of switch adapter boards is co-operating with a predetermined row of TS-modules in the matrix for input of data to the TS-modules in that row, and with a predetermined column of TS-modules in the matrix for output of data from the TS-modules of that column. In this way, it is possible to implement the switch structure into a number of subracks with a reasonable number of interconnections between different subracks, thus obtaining a truly modular TS-switch structure.

23 Claims, 13 Drawing Sheets

MODULAR TIME-SPACE SWITCH

TECHNICAL FIELD OF THE INVENTION

The invention generally relates to telecommunication, data communication and switching technology, and more particularly to a new switch architecture for circuit switching.

BACKGROUND

Switching is basically a question of organizing the flow of information between subscribers in a telecommunication or data communication system such that they can communicate with each other. Accordingly, switches are fundamental components of the communication system. They allow a subscriber to connect with any other remote subscriber in the system.

According to a particular type of switching called circuit switching, the subscriber information is normally assigned to time slots and the actual switching is performed on these time slots. Hence, in this case, a switch could be defined as a structure for handling time slots such that subscriber information is switched or connected from an arbitrary input point of the switch to an arbitrary output point.

The basic building blocks of switches are generally time (T) switch stages and space (S) switch stages. By combining time switch stages and space switch stages in different ways, a variety of switch structures are obtained. Examples of such switch structures are time-space-time (TST) switches, space-time-space (STS) switches, time-space (TS) switches, TSST-switches and SSTSS-switches.

The time-space (TS) switch is of particular interest because of its many advantages. First of all, and what is very important, the TS-switch is inherently strictly non-blocking, for point-to-point connections as well as for broadcasting. For other types of switches, point-to-point blocking can be alleviated by applying the well known Clos theorem. For TST-switches as an example, the Clos theorem states that the number of internal time slots should be doubled in order to achieve non-blocking for point-to-point connections. However, when it comes to broadcasting, blocking will occur in TST-switches.

Examples of other advantages of the TS-switch structure are given below:

short delay through the switch;

simple path selection; and simple control paths.

In addition, the speech store memories that are commonly utilized in TS-switches have become less expensive, thus making the TS-switch structure interesting also for larger switches.

However, because of the huge amount and the complexity of internal connections between speech stores, control stores and multiplexors in a TS-switch structure, the TS-switch is generally considered indivisible and non-modular. The internal components of a TS-switch have to be arranged tightly together in order to practically realize all the connections. For this reason, the TS-switch has to be provided in a single subrack. Hence, the size of the subrack sets a limit to the maximum capacity of the TS-switch, and available subracks are indeed limited in size. Conventional large TS-switches have a capacity of 128 K, although state-of-the-art TS-switches have reached up to 216 K when the technology is stretched to its limits, squeezing as many components and cable connections as possible into the same subrack. In many telecommunication applications, higher capacities, such as 256 or 512 K, are required, rendering the conventional TS-switch structure insufficient.

In addition, there is no simple way of offering capacity growth for smaller conventional TS-switches to capacities that lie within the conventional capacity range of up to 128 K. As an example, it is not an easy task to extend a conventional TS-switch installed with a capacity of 16 K to a capacity of 64 K. This makes the conventional TS-switch structure not only insufficient with regard to maximum capacity but also inflexible with regard to capacity growth.

The European patent application 0,558,291 A2 discloses a reconfigurable switch memory that is applicable to time switches and space switches such that two very different time switching functions can be efficiently implemented by one type of switching unit. The European patent application 0,558,291 A2 also discloses a reconfigurable STM switching unit which can work in either one bit or five bit mode so that the granularity of the switch can be varied. According to the European patent application, a simple way of offering growth is to use more switching units and to run these units in parallel.

The international patent application with publication number WO 95/32599 discloses a cross connect architecture for switching digital signals, in which the input stage is composed of parallel time-space (TS) switch blocks, the center stage is composed of parallel blocks formed by time and space switches (STS;TxT-S) and the output stage is composed of parallel space-time (ST) switch blocks. In order to make the architecture non-blocking, the number of blocks in the center stage is doubled relative to the minimum number of blocks. Apparently, the international patent application WO 95/32599 relates to a complex multi-stage switching architecture.

SUMMARY

The invention overcomes these and other drawbacks of the prior art.

A general object of the invention is to provide a robust and flexible switch architecture for circuit switching.

Another object of the invention is to provide a modular switch structure in which non-blocking and scalability with regard to capacity are combined.

A modular switch has advantages with regard to costs and flexibility. As an example, it is possible to start with a small switch with a single switch module or just a few modules to a relatively low cost. If the need for more capacity at a subsequent stage arises, then an appropriate number of further switch modules are easily added so as to make the overall switch bigger.

It is furthermore desirable to utilize the Time-Space (TS) switch structure, with all its advantages, as a basis for the modular switch architecture.

In particular, high capacities such as 256 K, 512 K or more should be easy to realize with this new modular TS-switch architecture.

These and other objects are solved by the invention.

The general idea according to the invention is to break out part of the space (S) switch functionality of a time-space (TS) switch core and arrange this part of the space functionality in groups of switch adapter boards, and to divide the relatively large TS-switch core into a matrix of smaller independent TS-modules that are associated with the switch adapter boards. Each group of switch adapter boards is co-operating with a predetermined row of TS-modules for input of data to the modules, and with a predetermined column of TS-modules for output of data from the modules.

By dividing the space (S) switch functionality into two parts, a first part in the TS-modules and a second part in the switch adapter boards, and interconnecting TS-modules and switch adapter boards in an appropriate way, it possible to implement the switch structure into a number of subracks with a reasonable number of interconnections between different subracks, thus obtaining a truly modular switch architecture based on TS-modules and switch adapter boards. This also makes it possible to build large TS-switch structures of 512 K or more.

The switch architecture according to the invention offers the following advantages:

strict non-blocking;

modularity (with capacities from e.g. 8 K to 512 K or more) including all the advantages of modular structures with regard to costs, flexibility and simplicity;

simple path selection; and short delay through the switch.

Other advantages offered by the present invention will be appreciated upon reading of the below description of the embodiments of the invention.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, wherein:

DETAILED DESCRIPTION

For a better understanding of the present invention, it is useful to begin by explaining the principle of a time-space switch unit. A common way of defining a time-space switch is to say that it is a switching unit in which all inputs are able to write to a number of speech stores such that the written data is accessible from all outputs. In the following, an illustrative example of a time-space switch unit will be given. It should however be understood that this example does not limit the scope of the invention, since it is possible to utilize other types of time-space switch units.

Figure 1:
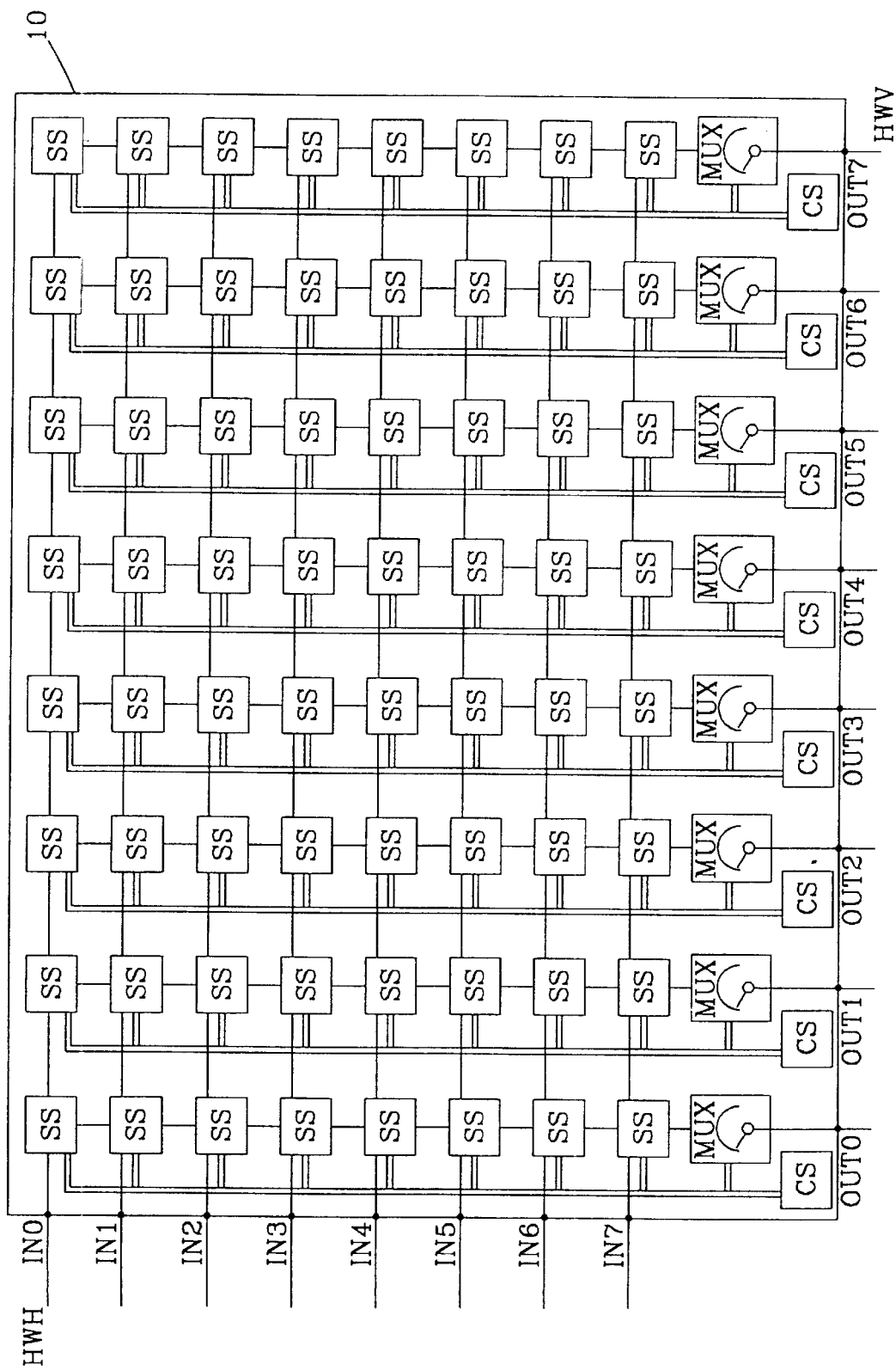
FIG. 1 is a schematic diagram of an illustrative example of a time-space switch unit.

FIG. 1 is a schematic diagram of an illustrative example of a time-space (TS) switch unit. The TS-switch unit 10 basically comprises a matrix of speech stores SS in which data in the form of user information is stored. The TS-switch unit 10 further comprises multiplexors MUX and control stores CS that are associated with the speech stores SS. The TS-switch unit 10 has a number of input terminals IN0 to IN7 connected to a number of input lines, referred to as Highway Horizontals HWH, and a number of output terminals OUT0 to OUT7 connected to a number of output lines, referred to as Highway Verticals HWV.

The user information is provided on the Highway Horizontals HWH to the input terminals IN0 to IN7 and subsequently to the speech stores SS. Each speech store SS in a given row of the speech store matrix is connected to the same input terminal such that all speech stores SS in that row receives the same set of data.

Furthermore, each column of speech stores SS is associated with a respective control store CS which controls the read-out of data from each one of the speech stores SS in the column. The read-out of data from the speech stores SS gives the time-space switch unit 10 its time-switching functionality.

Each column of speech stores SS is also associated with a respective controllable multiplexor MUX such that each speech store SS in the column is connected to the multiplexor MUX. In FIG. 1, for simplicity and in order to facilitate the reading of the drawing, a single line is shown to interconnect all the speech stores SS of a column with a common multiplexor MUX. However, it should be understood that there is a separate connection from each speech store SS in the column to the multiplexor MUX. The multiplexor MUX is connected to and controlled by the corresponding control store CS, and the multiplexor MUX determines from which speech store SS in the column that data should be read in response to control information stored in the control store CS. The output terminals OUT0 to OUT7 act as an interface between the multiplexors MUX and the external Highway Verticals HWV. The controllable multiplexors MUX give the time-space switch unit 10 its space-switching functionality.

As mentioned above, the TS-switch is inherently strictly non-blocking. Another inherent advantage of the TS-switch is the simple path selection, since from a given multiple position at the output to a given multiple position at the input there is only one path, and this path is always available for the connection between these multiple positions.

The TS-switch unit 10 illustrated in FIG. 1 has 8 input lines HWH and 8 output lines HWV with a 8×8 matrix of speech stores SS. If it is assumed, as an example, that each input line HWH handles 8192 time slots and that each speech store SS has 8192 positions, the result will be a traditional 64 K TS-switch unit.

Throughout the disclosure, when a 1 K switch unit is mentioned, it actually means a switch unit of 1024 multiple positions (MUP). In the same way, a 64 K switch unit means a switch unit of 65536 multiple positions.

Conventionally, if as an example a 128 K TS-switch is desired, the number of input lines as well as the number of output lines have to be doubled, i.e. 16 instead of 8, and the speech store matrix grows from a 8×8 matrix to a 16×16 matrix. The number of connections in the TS-switch increases dramatically, and the speech stores have to be arranged close to each other in a single subrack in order to practically realize all the interconnections. Due to this fact, larger TS-switch structures are conventionally almost impossible to realize in practice.

This problem is solved by the invention by making the overall TS-switch structure modular. According to the present invention, part of the space switch functionality of the TS-switch core is broken out and arranged in groups of switch adapter boards, and the TS-switch core itself is divided into a matrix of smaller and independent TS-modules or TS-switch units that are associated with the switch adapter boards. Each group of switch adapter boards is co-operating with a predetermined row of TS-modules for input of data to the modules, and with a predetermined column of TS-modules for output of data from the modules. In this way, it is possible to implement the TS-switch structure into a number of subracks with a reasonable number of interconnections between different subracks, thus obtaining a truly modular TS-switch structure. The modularity of the switch means that relatively small building blocks are handled such that the technical complexity never rises to unreasonable levels.

Figure 2:
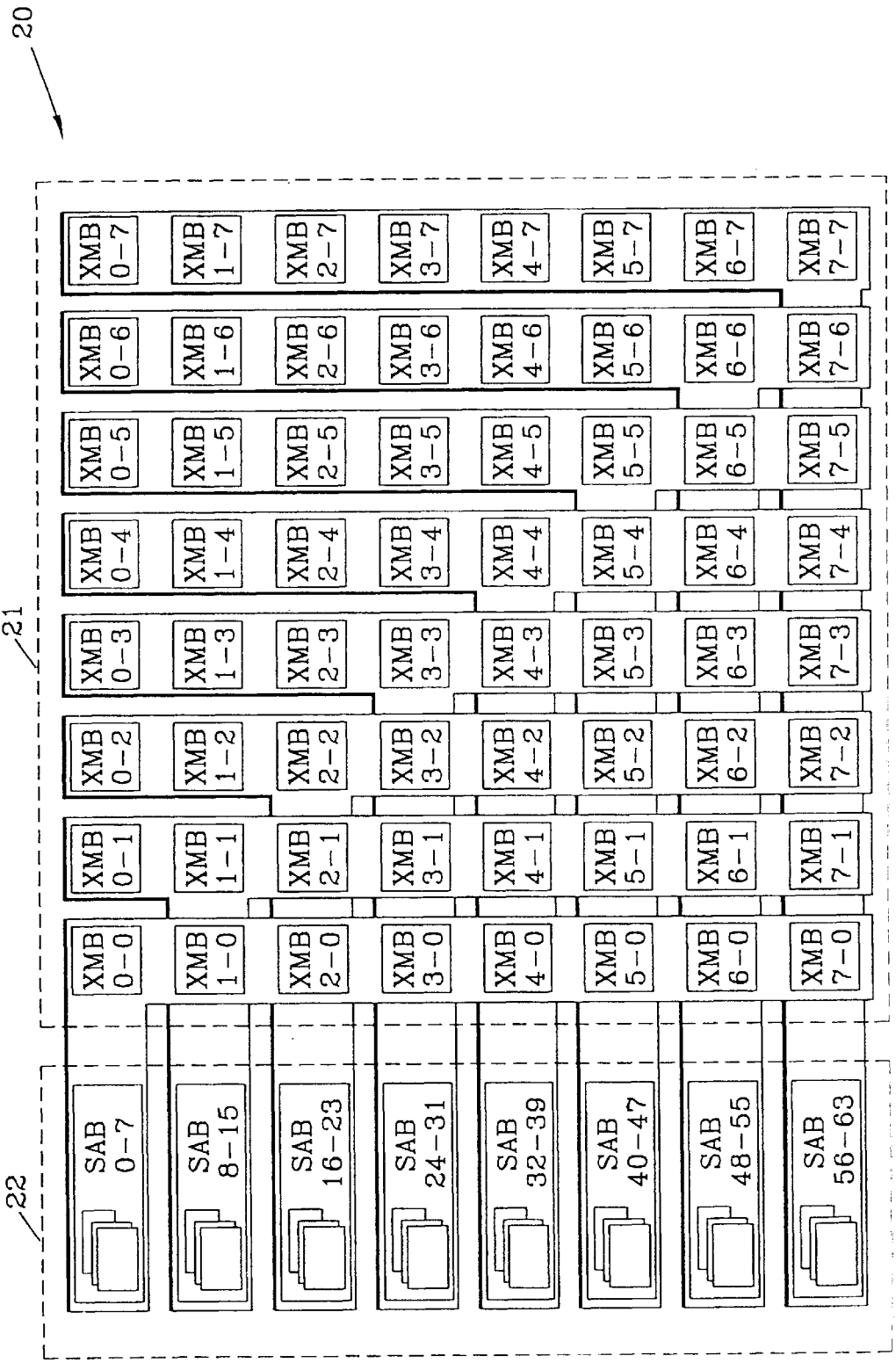
FIG. 2 is a schematic diagram of an illustrative example of the overall architecture of a modular switch structure based on TS-modules according to a first embodiment of the invention.

FIG. 2 is a schematic diagram of an illustrative example of the overall architecture of a modular switch structure based on TS-modules according to a first embodiment of the invention. The modular switch structure 20 comprises a matrix 21 of TS-switch units, also referred to as TS-switch modules, XMB0-0 to XMB7-7, and a number of switch adapter boards 22 arranged in groups SAB0–7, SAB8–15, . . . , SAB56–63. Each group of switch adapter boards is associated with a predetermined row of TS-modules XMB in the matrix 21 for inputting data to be stored in the speech stores of these TS-modules XMB. Each group of switch adapter boards is also associated with a predetermined column of TS-modules XMB in the matrix 21 for output of selected data from the TS-modules XMB in the column. The switch adapter boards SAB generally act as input interface as well as output interface of the switch structure 20.

The association of each group of switch adapter boards with a respective predetermined column of TS-modules is indicated in FIG. 2, where each group of switch adapter boards is enclosed together with its corresponding column of TS-modules XMB by solid lines. The bold lines in FIG. 2 are provided only to facilitate the reading of the drawing. The association of each group of switch adapter boards with a respective predetermined row of TS-modules is quite straightforward and therefore not indicated in FIG. 2.

Normally, the switch adapter boards SAB and the TS-modules XMB are arranged in subracks such that each subrack comprises:

a group of switch adapter boards;

a TS-module that makes up the initial switch together with the switch adapter boards in the subrack;

a selectable number of TS-modules that are interconnected to the switch adapter boards in the subrack but also capable of interfacing switch adapter boards in other subracks. These TS-modules are used to extend the switch above the capacity of the initial switch.

Figure 3:
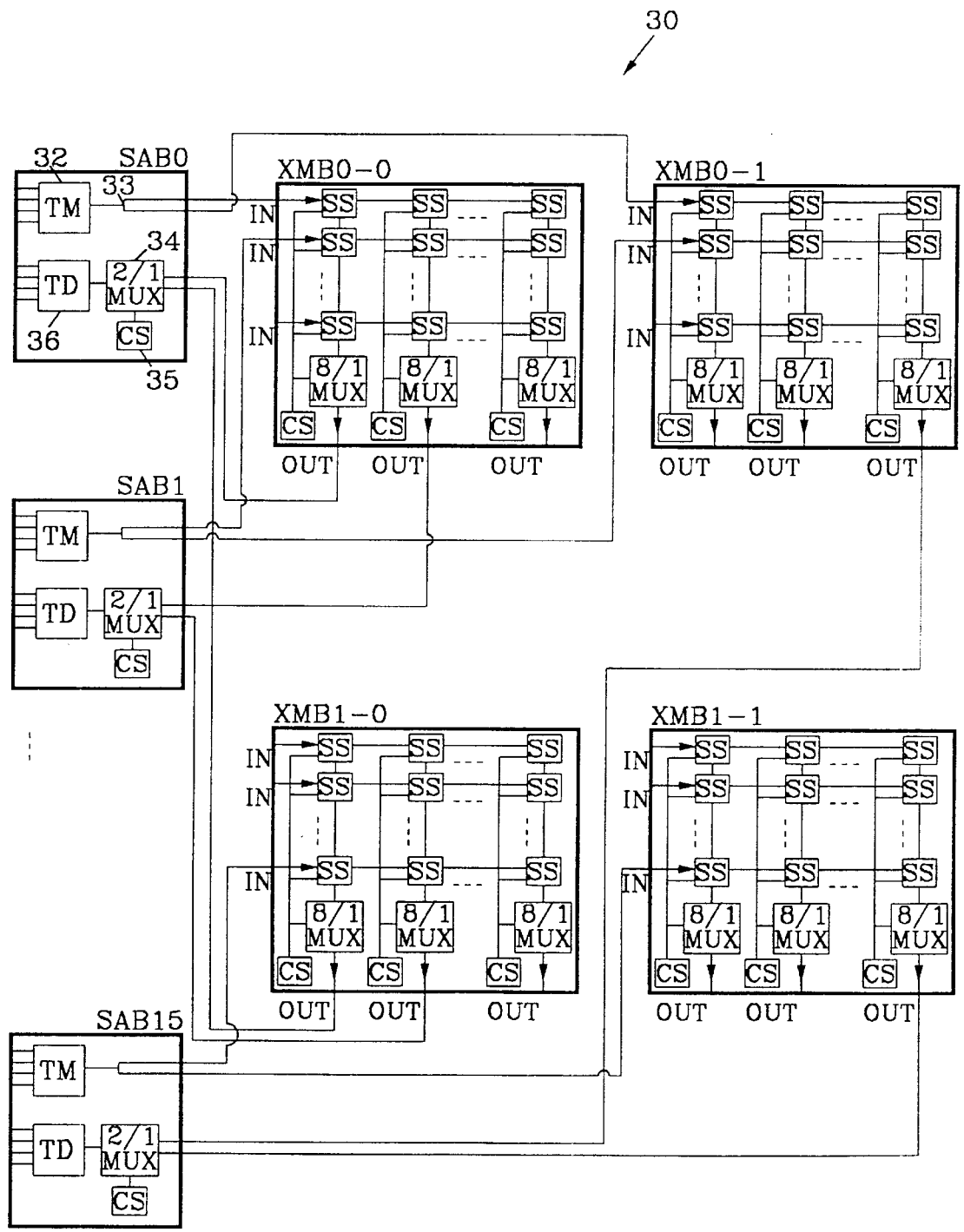
FIG. 3 is a schematic diagram of an illustrative example of a switch structure with a 2×2 matrix of TS-modules.

FIG. 3 is a more detailed schematic diagram of an illustrative example of a switch structure according to the first embodiment of the invention with a 2×2 matrix of TS-modules. The switch structure 30 comprises four TS-modules XMB0-0 to XMB1-1 arrangeable as a 2×2 matrix and 16 switch adapter boards SAB0 to SAB15. For simplicity, only the switch adapter boards SAB0, SAB1 and SAB15 are illustrated. The switch adapter boards SAB0 to SAB15 are arranged into two groups with 8 boards in each group; SAB0–SAB7 in a first group and SAB8–SAB15 in a second group. In this example, each TS-module XMB is a 64 K TS-switch unit, preferably similar to that illustrated in FIG. 1, with a 8×8 speech store matrix, 8 input terminals IN and 8 output terminals OUT.

The first group of adapter boards SAB0–7 is associated with the first row of TS-modules XMB0-0 and XMB0-1, and each switch adapter board SAB in that group is associated with a respective predetermined input terminal position of the TS-modules XMB0-0 and XMB0-1 in that row for transferring data from the switch adapter board to the TS-module speech stores SS that are associated with that input terminal position. Correspondingly, the second group of adapter boards SAB8–15 is associated with the second row of TS-modules XMB1-0 and XMB1-1. Each switch adapter board SAB of the second group SAB8–15 is associated with a respective predetermined input terminal position of the TS-modules XMB1-0 and XMB1-1 in the second row for transferring data to the speech stores associated with that input terminal position.

In this particular example, each switch adapter board SAB comprises an input interface for a number of incoming digital links in the front, a time-multiplexing unit 32, a distribution point 33, a controllable selector 34, a control store 35 and a time-demultiplexing unit 36. The time-multiplexing unit 32 multiplexes data from the incoming links into a single stream of time-multiplexed data, and the output terminal of the time-multiplexing unit 32 is connected to the distribution point 33 which receives the stream of multiplexed data from the time-multiplexing unit 32. The distribution point 33 is connected to the TS-switch module input terminals IN at a predetermined input terminal position, and distributes the multiplexed data thereto via a Highway Horizontal interface such that all speech stores SS, in each of the TS-modules in the associated row, that are connected to an input terminal IN at that position receives the multiplexed data.

With reference to FIG. 3, it can be seen that the distribution point 33 of the switch adapter board SAB0 is connected to the first input terminal of the TS-module XMB0-0 as well as the first input terminal of the TS-module XMB0-1. The distribution point of SAB1 is connected to the second input terminal of XMB0-0 and XMB0-1, whereas the distribution point of SAB15 is connected to the last input terminal of XMB1-0 and XMB1-1.

Each group of switch adapter boards is also associated with a predetermined column of TS-modules XMB in the matrix. The first group of adapter boards SAB0–7 is associated with the first column of TS-modules XMB0-0 and XMB1-0, and each switch adapter board SAB in that group is associated with a respective predetermined output terminal position of the TS-modules XMB0-0 and XMB1-0 in that column for fetching data from the output terminals OUT at that position. Correspondingly, the second group of adapter boards SAB8–15 is associated with the second column of TS-modules XMB0-1 and XMB1-1.

The controllable selector 34 is connected to the switch module output terminals OUT at a predetermined output terminal position for receiving data therefrom. The control store CS 35 is connected to the selector 34 and holds control information which controls the selector 34. The controllable selector 34 selects data from one of the output terminals OUT at the predetermined output terminal position as selector output data, in response to the control information held in the control store CS 35. In this example, the selector 34 is preferably a 2/1 MUX, and the output of the selector 34 is connected to a time demultiplexing unit 36 which has an output interface for a number of outgoing digital links.

With reference once again to FIG. 3, it can be seen that the controllable selector 34 of the switch adapter board SAB0 is connected to the first output terminal of the TS-module XMB0-0 as well as to the first output terminal of the TS-module XMB1-0. The selector of SAB1 is connected to the second output terminal of XMB0-0 and XMB1-0, whereas the selector of SAB15 is connected to the last output terminal of XMB0-1 and XMB1-1.

The multiplexors 8/1 MUX in the TS-modules act as a first part of the space-switching functionality of the TS-switch structure 30, and the controllable selectors 34 in the switch adapter boards act as a second part of the space-switching functionality. This division of functionality enables a modular switch structure. However, it should be emphasized that the functionality of the controllable selectors 34 actually is to select a reduced set of data from a larger set of data obtained from the TS-modules XMB.

It should be appreciated that the input terminal of the distribution point 33 can act as input interface of the switch adapter board instead of the time-multiplexing unit 32, and that the output terminal of the selector 34 can act as output interface of the switch adapter board instead of the time-demultiplexing unit 36.

Of course, as will be understood by those skilled in the art, the overall switch not only includes the switch structure 30 but also auxiliary devices such as a control unit (not shown) and a clock and synchronization signal generating system (not shown).

Figure 4:
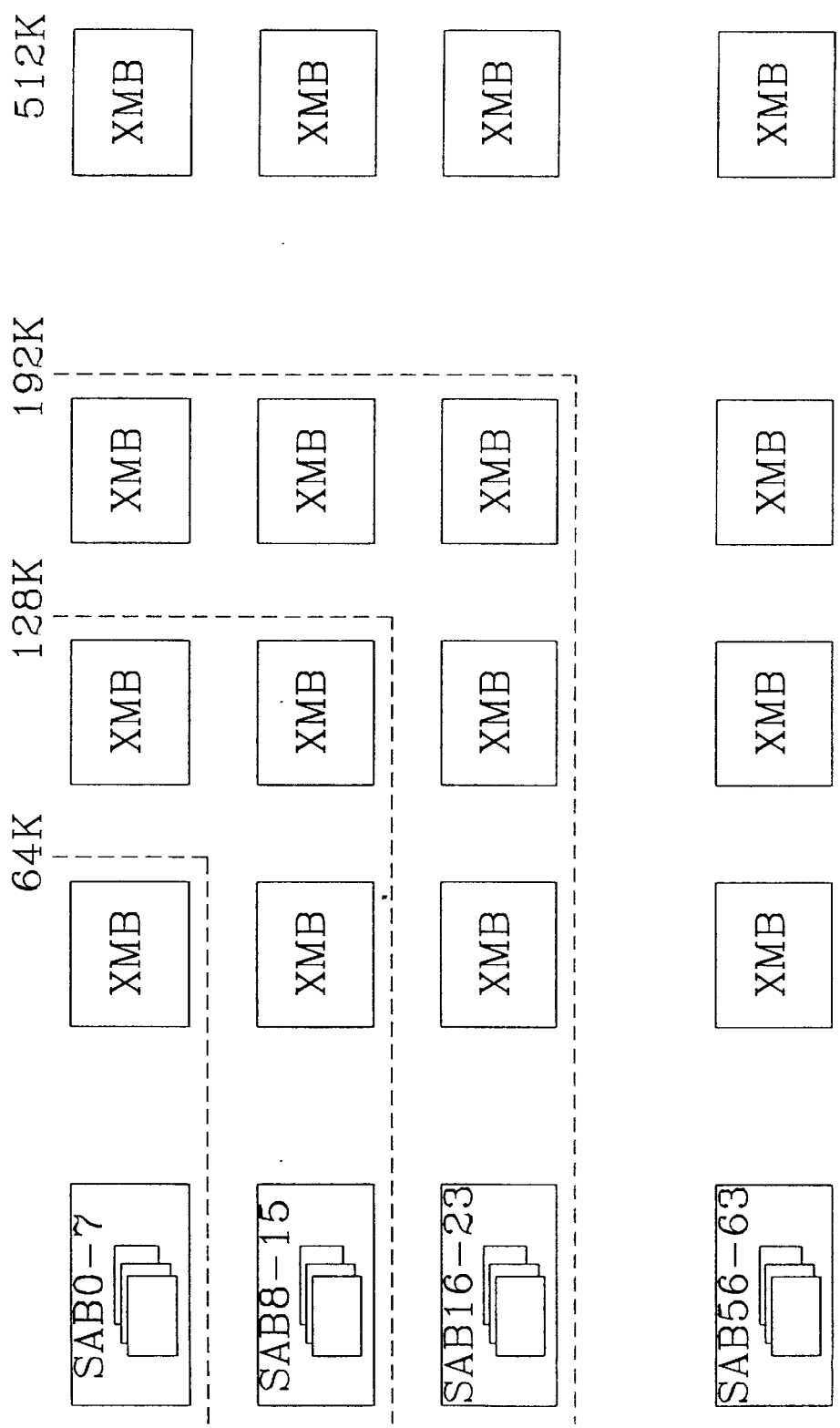
FIG. 4 is a schematic diagram illustrating the principle of designing switch structures of different capacities based on TS-modules.

FIG. 4 is a schematic diagram illustrating the principle of designing switch structures of different sizes based on TS-modules XMB and switch adapter boards SAB. Assume, as an example, that each TS-module XMB is a 64 K TS-switch unit. Then, in order to obtain a 128 K switch structure, 4 TS-switch modules XMB arrangeable as a 2×2 matrix, and two group of switch adapters SAB0–7 and SAB8–15 have to be used. For a 192 K switch structure, 9 TS-switch modules XMB arrangeable as a 3×3 matrix, and three groups of switch adapters SAB0–7, SAB8–15, SAB16–23 must be used. The modular TS-switch concept according to the invention allows even larger switches. By using further switch modules XMB and switch adapter boards SAB, TS-switch structures of up to 512 K or more are easily obtained. Table I below illustrates the relationship between total switch size and the number of required TS-switch modules XMB and switch adapter boards SAB, assuming that each TS-switch module has a total capacity of 64 K with an 8×8 matrix of speech stores, and that each switch adapter board has an 8/1 selector.

TABLE 1

| Switch size (K) | Number of TS-modules | Number of switch adapter boards |
|---|---|---|
| 8 | 1 | 1 |
| 16 | 1 | 2 |
| 64 | 1 | 8 |
| 128 | 4 | 16 |

TABLE 1-continued

| Switch size (K) | Number of TS-modules | Number of switch adapter boards |
|---|---|---|
| 192 | 9 | 24 |
| 256 | 16 | 32 |
| 320 | 25 | 40 |
| 384 | 36 | 48 |
| 448 | 49 | 56 |
| 512 | 64 | 64 |

The 16 K switch comprises a single TS-module which uses 16 K out of the total 64 K, and two associated switch adapter boards, whereas the 8 K switch comprises a single TS-module which uses 8 K of the total 64 K, and a single switch adapter board. The 8 K switch and the 16 K switch are indicated in Table I to give an illustration of how the inventive concept is applied to very small switches.

Of course, it should be understood that it is possible to utilize switch modules that are smaller than 8 K or bigger than 64 K. As a first example, a TS-switch module with a 2×2 matrix of speech stores, where each speech store is capable of holding 512 multiple positions, will constitute a 1 K switch unit. As a second example, a TS-switch module with a 16×16 matrix of speech stores, where each speech store is capable of holding 8192 multiple positions, will constitute a 128 K switch unit. In the latter case, by using an 8×8 matrix of 128 K TS-switch modules and 8 groups of switch adapter boards designed to work with 128 K TS-switch modules, a switch structure with a total capacity of 1024 K will be obtained.

Furthermore, in addition to word-oriented TS-switch modules, it is possible to use bit-oriented TS-switch modules. In an embodiment of the invention, at least one of the TS-switch modules comprises a bit-oriented time-space switch unit.

It has been shown that the present invention provides a truly modular TS-switch structure based on only two different types of units; time-space switch modules XMB and switch adapter boards SAB. It is possible to start with a small TS-switch structure with just a few units to a relatively low cost. Later on, if more switch capacity is needed, the TS-switch structure is easily extended by adding more units. In this way, the effective cost will correspond closely to the actual capacity demand. In addition, similar or identical software and maintenance routines may be utilized for switches of all sizes, since the primary building blocks, i.e. the TS-modules and the switch adapter boards, are the same.

An Example of a 512 K Switch

Figure 5:
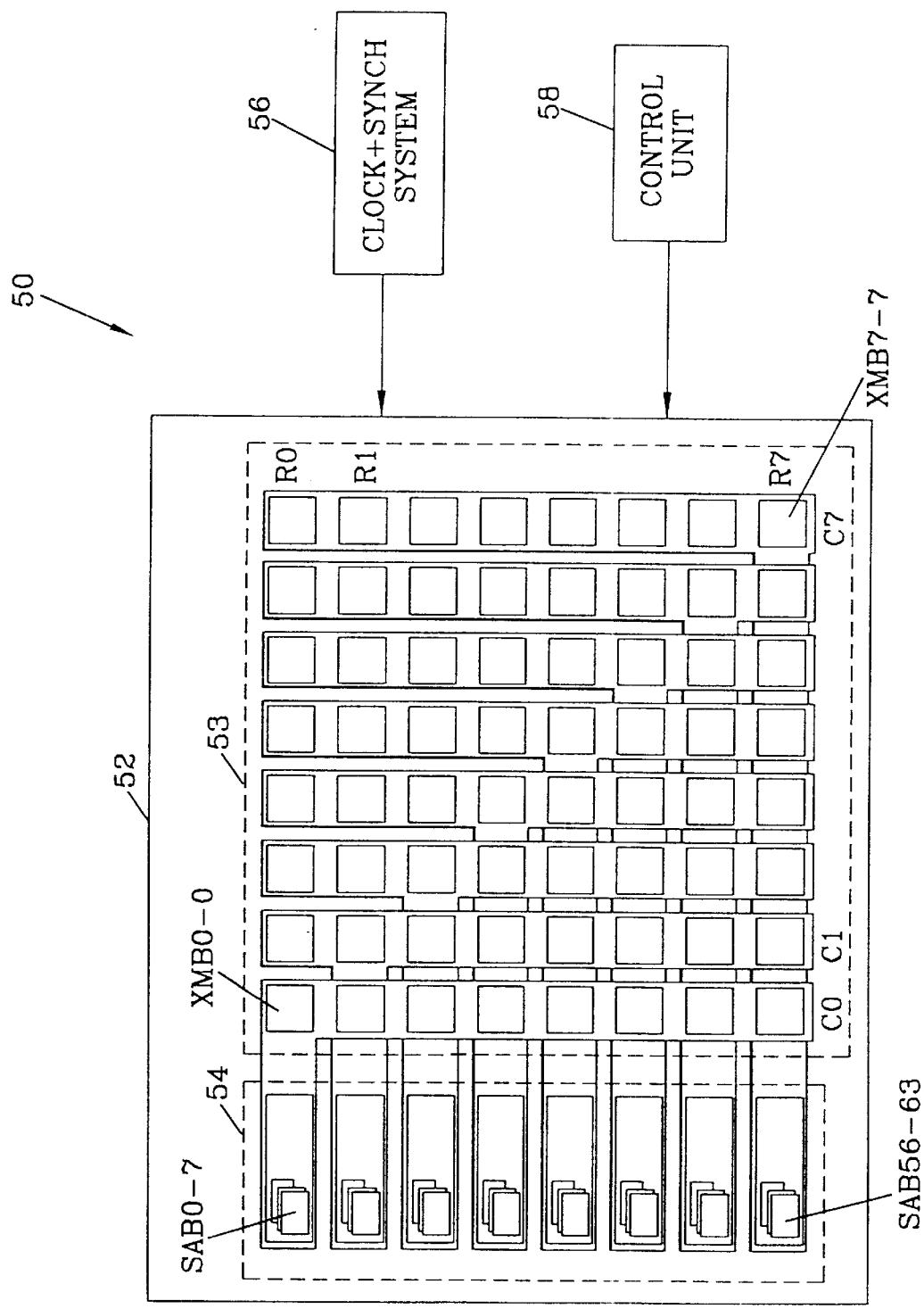
FIG. 5 is a schematic block diagram of an illustrative example of a 512 K switch according to the invention.

FIG. 5 is a schematic block diagram of an illustrative example of a 512 K switch according to the first embodiment of the invention. The communication switch 50 comprises a switch structure 52 for the actual switching functionality, a clock and synchronization system 56 for providing clock signals and synchronization signals to the circuits in the switch structure 52, and a control unit 58 for controlling the switching operations of the switch structure 52. If the switch structure 52 is built based on 64 K TS-switch modules, it can be seen from table I above that 64 TS-switch modules are required for a switch structure of 512 K. Accordingly, the 512 K switch structure 52 basically comprises 64 TS-switch modules 53 arrangeable as a 8×8 matrix, and 64 switch adapter boards 54 arrangeable in 8 groups, with 8 switch adapter boards in each group. The rows of the matrix 53 of TS-modules are designated as R0 to R7 and the columns as C0 to C7. The TS-modules themselves are indicated as XMB0-0 to XMB7-7, and the 8 groups of switch adapter boards are indicated as SAB0–7 to SAB 56–63, in the same manner as in FIG. 2.

First of all, each group of switch adapter boards is associated with the TS-switch modules XMB of a predetermined row of the switch module matrix 53 for inputting data to the TS-switch modules of that row, and with the TS-switch modules of a predetermined column of the switch module matrix 53 for outputting data from the TS-switch modules of that column. Table II below illustrates this relationship.

TABLE II

| Group of switch adapter boards | Associated row of TS-modules | Associated column of TS-modules |
| --- | --- | --- |
| SAB0-7 | R0[XMB0-0 to XMB0-7] | C0[XMB0-0 to XMB7-0] |
| SAB8-15 | R1[XMB1-0 to XMB1-7] | C1[XMB0-1 to XMB7-1] |
| SAB16-23 | R2[XMB2-0 to XMB2-7] | C2[XMB0-2 to XMB7-2] |
| SAB24-31 | R3[XMB3-0 to XMB3-7] | C3[XMB0-3 to XMB7-3] |
| SAB32-39 | R4[XMB4-0 to XMB4-7] | C4[XMB0-4 to XMB7-4] |
| SAB40-47 | R5[XMB5-0 to XMB5-7] | C5[XMB0-5 to XMB7-5] |
| SAB48-55 | R6[XMB6-0 to XMB6-7] | C6[XMB0-6 to XMB7-6] |
| SAB56-63 | R7[XMB7-0 to XMB7-7] | C7[XMB0-7 to XMB7-7] |

The switch adapter boards generally act as input interface and output interface of the switch structure (52) as well as of the whole switch (50).

Further, each switch adapter board SAB has an input interface (not shown) for 4 digital links, where each digital link is capable of transporting 2048 time slots of a bit rate of 196 Mb/s. The digital links are multiplexed into a Highway Horizontal interface (not shown) capable of transporting 8192 time slots. Preferably, the Highway Horizontal interface has 8 highways and a total data rate of 786 Mb/s. The multiplexed data is sent out on all enabled Highway Horizontals from a common distribution point (not shown) in the switch adapter board.

The bit rates are indicated to give the reader an idea of the switching complexity in this example, and should not be interpreted as precise frequencies.

Assume as an example that each TS-module in the matrix 53 is similar to that illustrated in FIG. 1. Hence, each TS-switch module has 64 speech stores arrangeable as a 8×8 speech store matrix, 8 input terminals IN0 to IN7, one for each row of speech stores, 8 output terminals OUT0 to OUT7, one for each column of speech stores, 8 multiplexors and 8 control stores. Since each Highway interface is capable of transporting 8192 time slots, each speech store is designed to hold 8192 multiple positions. This means that each TS-switch module has a capacity of 8×8192=65536 multiple positions, i.e. a 64 K switch unit. The working frequency is about 65 MHz. Each multiplexor in the TS-module is associated with a respective column of the speech store matrix such that the speech stores in the column are connected to the inputs of the multiplexor. The output terminals of the multiplexors are connected respectively to the output terminals OUT1 to OUT7 of the TS-switch module. To each column of the speech store matrix there is also associated a control store that is connected to all speech stores in the column and to the multiplexor that is associated with the same speech store column. Each control store holds control information that control:

the read-out of data from each one of the speech stores in the speech store column; and from which speech store in the speech store column that data should be retrieved by the multiplexor.

Each switch adapter board in a given group of switch adapter boards is associated with a respective predetermined input terminal position of the TS-switch modules in the row of TS-modules that is associated with this group of switch adapter boards. Data is distributed from the distribution point in the switch adapter board, on the Highway Horizontals, to the switch module input terminals at the given input terminal position. In each TS-module, each speech store in a predetermined row of the speech store matrix is connected to the same input terminal for enabling all speech stores in that speech store row to receive the same set of data from a Highway Horizontal. It is important to understand that in a given TS-module, different input terminals are connected to Highway Horizontals coming from different switch adapter boards in the same group of switch adapter boards.

Each switch adapter board in a given group of switch adapter boards is also associated with a respective predetermined output terminal position of the TS-switch modules in the column of TS-modules that is associated with this group of switch adapter boards, and comprises a controllable selector (not shown) that is connected to the switch module output terminals at this output terminal position through a Highway Vertical interface of 8 highways. This Highway Vertical interface is capable of transporting 8192 time slots, and has a total data rate of 786 Mb/s. The controllable selector receives data from all output terminals at this output terminal position to select data from one of the output terminals as selector output data. The selector output data is time-demultiplexed and sent out from the switch adapter board on 4 outgoing digital links, each digital link being capable of transporting 2048 time slots at a bit rate of 196 Mb/s.

Table III below illustrates the relation between switch adapter boards on one hand and input terminal positions and output terminal positions on the other hand.

TABLE III

| Switch adapter board | Input terminal position | Output terminal position |
| --- | --- | --- |
| SAB0 | IN0 of R1[XMB0-0 to XMB0-7] | OUT0 of C1[XMB0-0 to XMB7-0] |
| SAB1 | IN1 of R1 | OUT1 of C1 |
| SAB2 | IN2 of R1 | OUT2 of C1 |
| SAB3 | IN3 of R1 | OUT3 of C1 |
| SAB4 | IN4 of R1 | OUT4 of C1 |
| SAB5 | IN5 of R1 | OUT5 of C1 |
| SAB6 | IN6 of R1 | OUT6 of C1 |
| SAB7 | IN7 of R1 | OUT7 of C1 |
| SAB8 | IN0 of R2[XMB1-0 to XMB1-7] | OUT0 of C2[XMB0-1 to XMB7-1] |
| SAB9 | IN1 of R2 | OUT1 of C2 |
| . | | |
| SAB15 | IN7 of R2 | OUT7 of C2 |
| SAB16 | IN0 of R3[XMB2-0 to XMB2-7] | OUT0 of C3[XMB0-2 to XMB7-2] |
| . | | |
| SAB63 | IN7 of R7[XMB7-0 to XMB7-7] | OUT7 of C7[XMB0-7 to XMB7-7] |

As an example, table III indicates that the switch adapter board SAB0 is associated with the input terminal position IN0 of row R1, and with the output terminal position OUT0 of column C1.

A point-to-point connection between a given input multiple position (MUP) and a given output multiple position (MUP) in the switch is generally established under the control of an overall control system (not shown) which gives connection set-up instructions to the control unit 58. The control unit 58 then sets the corresponding control stores in the switch structure 52 in accordance with the instructions from the overall control system, thus creating a circuit between the input MUP and the output MUP.

The switch structure according to the invention is operable for circuit switching data, and each group of switch adapter boards is co-operating with a predetermined row of TS-modules for inputting data to be circuit-switched, into the TS-modules in that row, and with a predetermined column of TS-modules for outputting a selected subset of the data available at the output terminals of the TS-modules in that column. A person skilled in switching technology should have no problems in understanding the relations between the subsets of data handled by the switch as well as the general flow of data through the switch.

It should be understood that the term "speech store" does not only mean a store for speech data, but should be interpreted as any memory for storing user information in general. The term "speech store" has been chosen because of its accepted and common usage as a memory in connection with telecommunication and switching technology.

Since it is possible to arrange a complete group of switch adapter boards onto a single circuit board, the term switch adapter unit might be more suitable than the term switch adapter board. However, when each switch adapter unit is provided on a single circuit board, the term switch adapter board is of course appropriate.

For smaller switch structures, it is convenient to provide each TS-module on a separate individual circuit board. For larger switch structures it might be more advantageous to arrange several TS-modules on the same board. In the latter case, the TS-modules are preferably arranged onto the circuit boards column-wise such that all TS-modules that belong to the same column is provided on the same circuit board.

Of course, other ways of arranging the switch adapter units and the TS-modules onto circuit boards are also feasible.

A Second Embodiment

Figure 6:
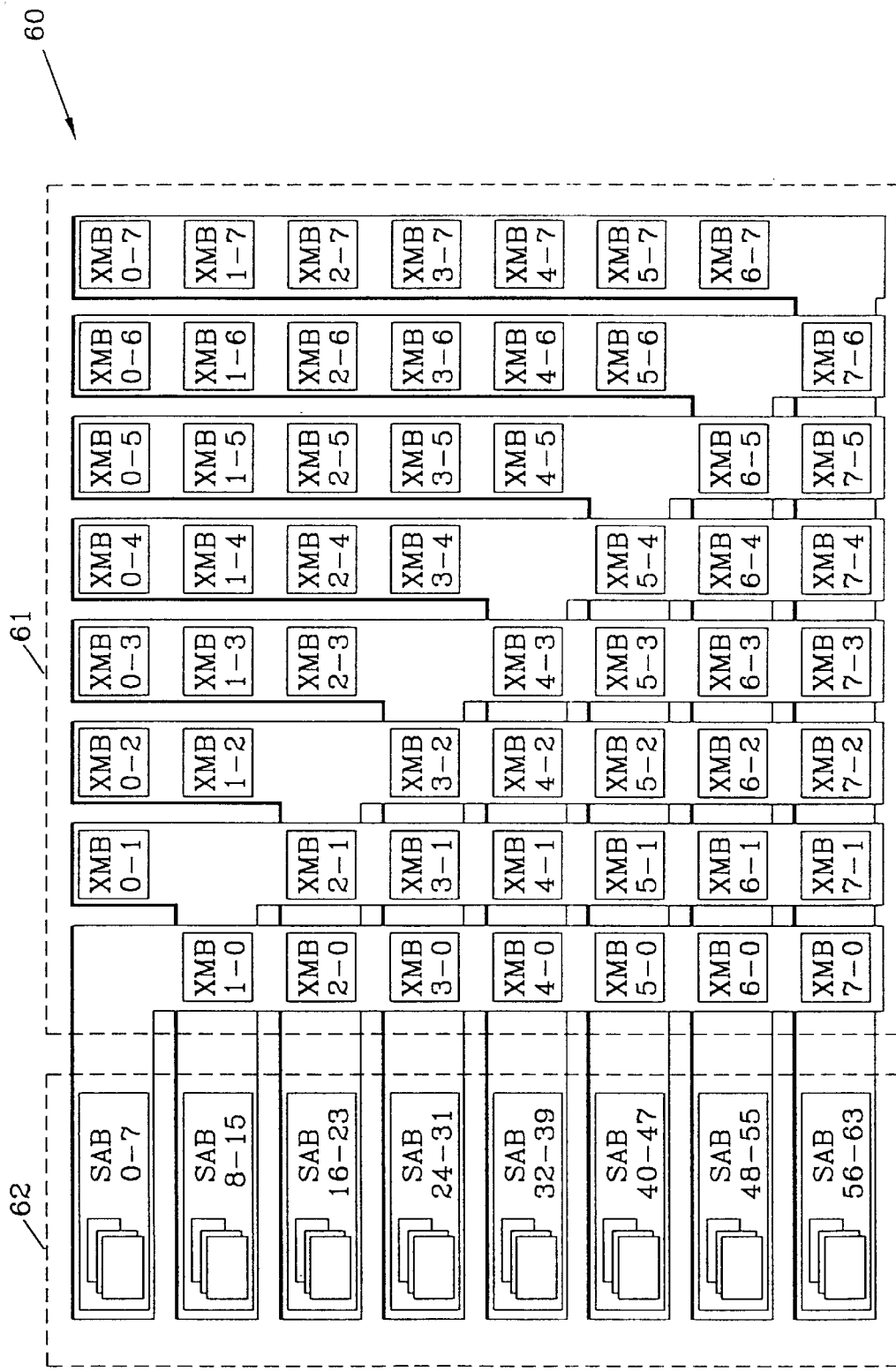
FIG. 6 is a schematic diagram of an illustrative example of the overall architecture of a modular switch structure according to a second embodiment of the invention.

FIG. 6 is a schematic diagram of an illustrative example of the overall architecture of a modular switch structure according to a second embodiment of the invention. The overall architecture of the modular switch structure 60 illustrated in FIG. 6 is similar to that of the switch structure 20 of FIG. 2. The switch structure 60 comprises a matrix 61 of TS-switch modules, XMB0-1 to XMB7-6, and a number of switch adapter boards 62, also called switch adapter units, arranged in groups SAB0–7, SAB8–15, . . . , SAB56–63. However, as can be seen in FIG. 6, there are no diagonal TS-modules in the matrix 61, and hence the matrix 61 is incomplete. The switching functionality that corresponds to the diagonal TS-modules shown in the switch structure 20 of FIG. 2 is now incorporated into the switch adapter boards SAB in the switch structure 60 of FIG. 6. The TS-switch modules XMB0-1 to XMB7-6 are preferably similar to the TS-switch unit illustrated in FIG. 1.

In the same manner as in the first embodiment of the invention, each group of switch adapter boards is associated with a predetermined row of TS-modules XMB in the matrix 61 for inputting data to be stored in the speech stores of these TS-modules. Each group of switch adapter boards is also associated with a predetermined column of TS-modules XMB in the matrix 61 for output of selected data from the TS-modules XMB in the column. The association of each group of switch adapter boards with a respective column of TS-modules is indicated in FIG. 6, where each group of switch adapter boards is enclosed together with its corresponding column of TS-modules XMB by solid lines. The bold lines in FIG. 6 are provided only to facilitate the reading of the figure.

The switching functionality corresponding to a given diagonal TS-module is now divided and incorporated into the group of switch adapter boards that is associated with the TS-module column in which the diagonal TS-module formerly was located, such that each switch adapter board in this group of switch adapter boards comprises a fractional TS-module. Preferably, the speech store columns that formerly made up the diagonal TS-module are now relocated into the switch adapter boards such that the fractional TS-module in each switch adapter board in a group of switch adapter boards includes a respective speech store column. Of course, each fractional TS-module also includes a multiplexor and a control store that are associated with the speech store column. This will be described in more detail later on in connection with FIG. 8.

In this way, each switch adapter board includes its own time-space switching functionality. Thus, it is possible to start with a small TS-switch structure comprising just a single switch adapter board. For such a small switch structure, no TS-module is required since the switch adapter board itself includes a TS-switching functionality. The switch structure is easily extended up to a complete group of switch adapter boards, still without using any TS-modules. Hence, for small switch structures, only one type of circuit board, the switch adapter board, is needed. However, if two groups of switch adapter boards or more are needed, non-diagonal TS-modules are required.

Table IV below illustrates the relationship between total switch size and the number of required TS-switch modules XMB and switch adapter boards SAB, according to the second embodiment of the invention. It is assumed that each switch adapter board has a switching capacity of 8 K, that a group of 8 switch adapter boards has a switching capacity of 64 K, and that each TS-module is a 64 K TS-switch unit.

TABLE IV

| Switch size (K) | Number of TS-modules | Number of switch adapter boards |
| --- | --- | --- |
| 8 | 0 | 1 |
| 16 | 0 | 2 |
| 64 | 0 | 8 |
| 128 | 2 | 16 |
| 192 | 6 | 24 |
| 256 | 12 | 32 |
| 320 | 20 | 40 |
| 384 | 30 | 48 |
| 448 | 42 | 56 |
| 512 | 56 | 64 |

By incorporating the switching functionality of the diagonal TS-modules into the switch adapter boards, the number of necessary TS-modules in the switch structure according to the second embodiment of the invention, will be reduced compared to the first embodiment. This is apparent from a comparison of Table IV and Table I.

For larger switch structures, requiring two groups of switch adapter boards or more, the switch adapter boards and its corresponding TS-modules are normally arranged in subracks. Each subrack then typically includes.

a group of switch adapter boards that can perform switching within the subrack;
  a selectable number of TS-modules that are capable of interfacing switch adapter boards in other subracks.

These TS-modules are used when the switch is extended above the capacity of one group of switch adapter boards.

Figure 7:
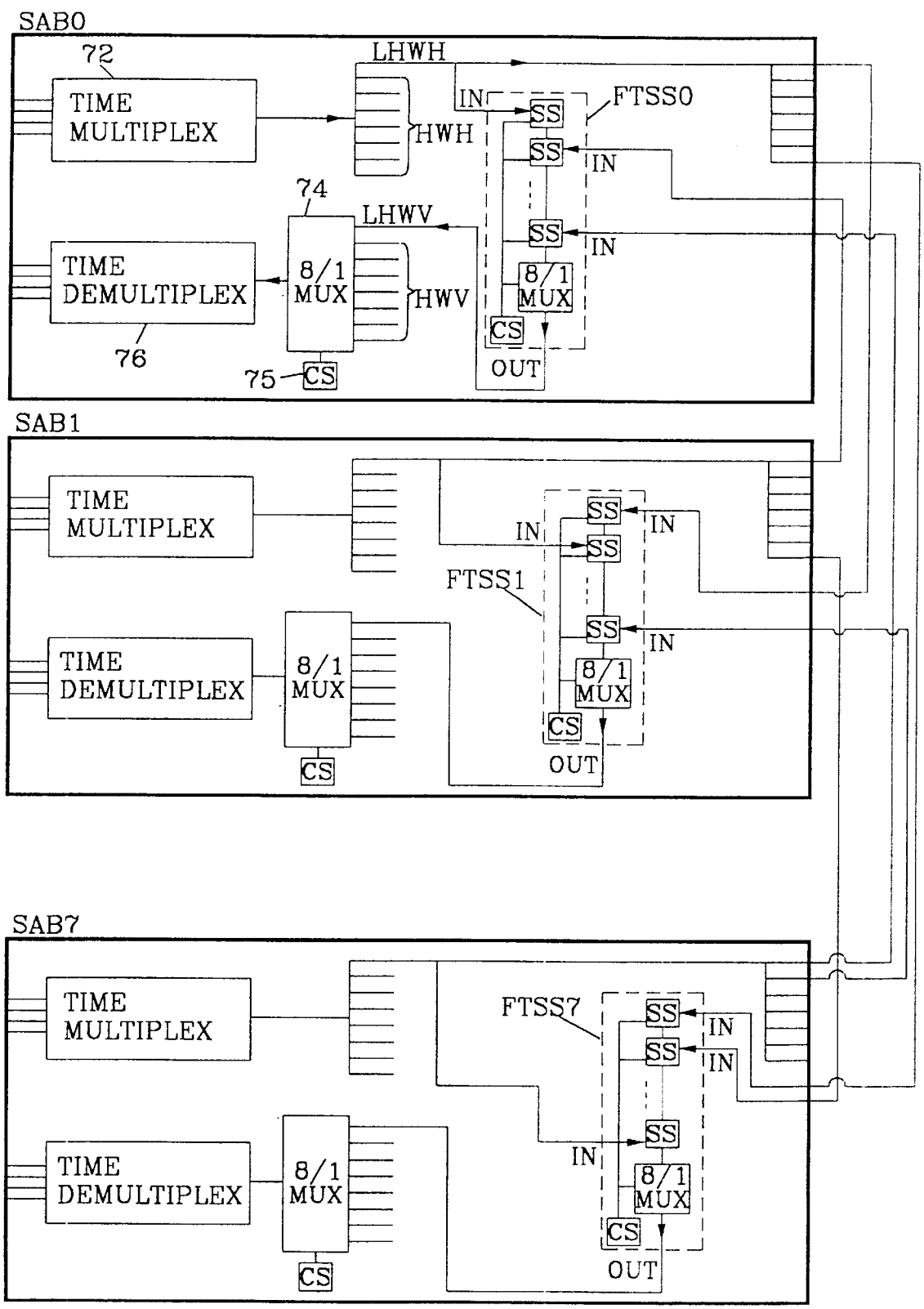
FIG. 7 is a schematic diagram of a group of switch adapter boards according to the second embodiment of the invention.

FIG. 7 is a schematic diagram of an example of a group of switch adapter boards according to the second embodiment of the invention. The group comprises 8 switch adapter boards SAB0 to SAB7. For simplicity, only the switch adapter boards SAB0, SAB1 and SAB7 are illustrated.

In this particular example, each switch adapter board SAB comprises an input interface for a number of incoming digital links in the front, a time-multiplexing unit 72, a fractional time-space switch module FTSS, a controllable selector 74, a control store 75 and a time-demultiplexing unit 76.

The time-multiplexing unit 72 multiplexes data from the incoming links into 7 Highway Horizontals (HWH) and 8 Local Highway Horizontals (LHWH). The fractional time-space switch module FTSS has 8 input terminals IN and an output terminal OUT, and includes a column of speech stores SS, an associated multiplexor 8/1 MUX and a control store CS. The 7 Highway Horizontals HWH are capable of interfacing non-diagonal TS-modules XMB that belong to a predetermined row in the matrix 61 (FIG. 6). One of the 8 Local Highway Horizontals LHWH goes to the fractional TS-switch module FTSS in the current switch adapter board, and the remaining 7 LHWHs are connected to the other switch adapter boards in the same switch adapter board group and more particularly to the fractional TS-switch modules FTSS therein.

Each switch adapter board SAB in a group of switch adapter boards is associated with a predetermined input terminal position of the non-diagonal TS-switch modules XMB (FIG. 6) in the row associated with this group of switch adapter boards, in the same manner as in the first embodiment of the invention (see Table III above), and with the input terminals of the fractional time-space switch modules FTSS of the switch adapter boards SAB that belong to this group of switch adapter boards, at this predetermined input terminal position.

With reference to FIG. 7, it can be seen that the LHWHs of the switch adapter board SAB0 is connected to the first input terminal of the fractional TS-switch module FTSS0 in SAB0, and to the first input terminal of FTSS1 in SAB1 and to the first input terminal of FTSS7 in SAB7. The LHWHs of the switch adapter board SAB1 is connected to the second input terminal of the fractional TS-switch module FTSS1 in SAB1, and to the second input terminal of FTSS0 in SAB0 and to the second input terminal of FTSS7 in SAB7. The LHWHs of the switch adapter board SAB7 is connected to the last input terminal of FTSS7 in SAB7, and to the last input terminal of FTSS0 in SAB0 and to the last input terminal of FTSS1 in SAB1.

Each switch adapter board SAB in a group of switch adapter boards is also associated with a respective predetermined output terminal position of the non-diagonal TS-switch modules XMB (FIG. 6) in the matrix column associated with this group of switch adapter boards, in the same manner as in the first embodiment of the invention (see Table III above). The controllable selector 74 is connected through 7 Highway Verticals HWV to the TS-switch module output terminals at this predetermined output terminal position and through a local Highway Vertical LHWV to the output terminal OUT of the fractional time-space switch module FTSS in the current switch adapter board for receiving data therefrom. The control store CS 75 is connected to the selector 74 and holds control information that controls the selector 74. The controllable selector 74 selects data from one of the above output terminals as selector output data, in response to the control information held in the control store CS 75. In this example, the selector 74 is a 8/1 MUX, and the output of the selector 74 is connected to a time demultiplexing unit 76 which has an output interface for a number of outgoing digital links.

Figure 8:
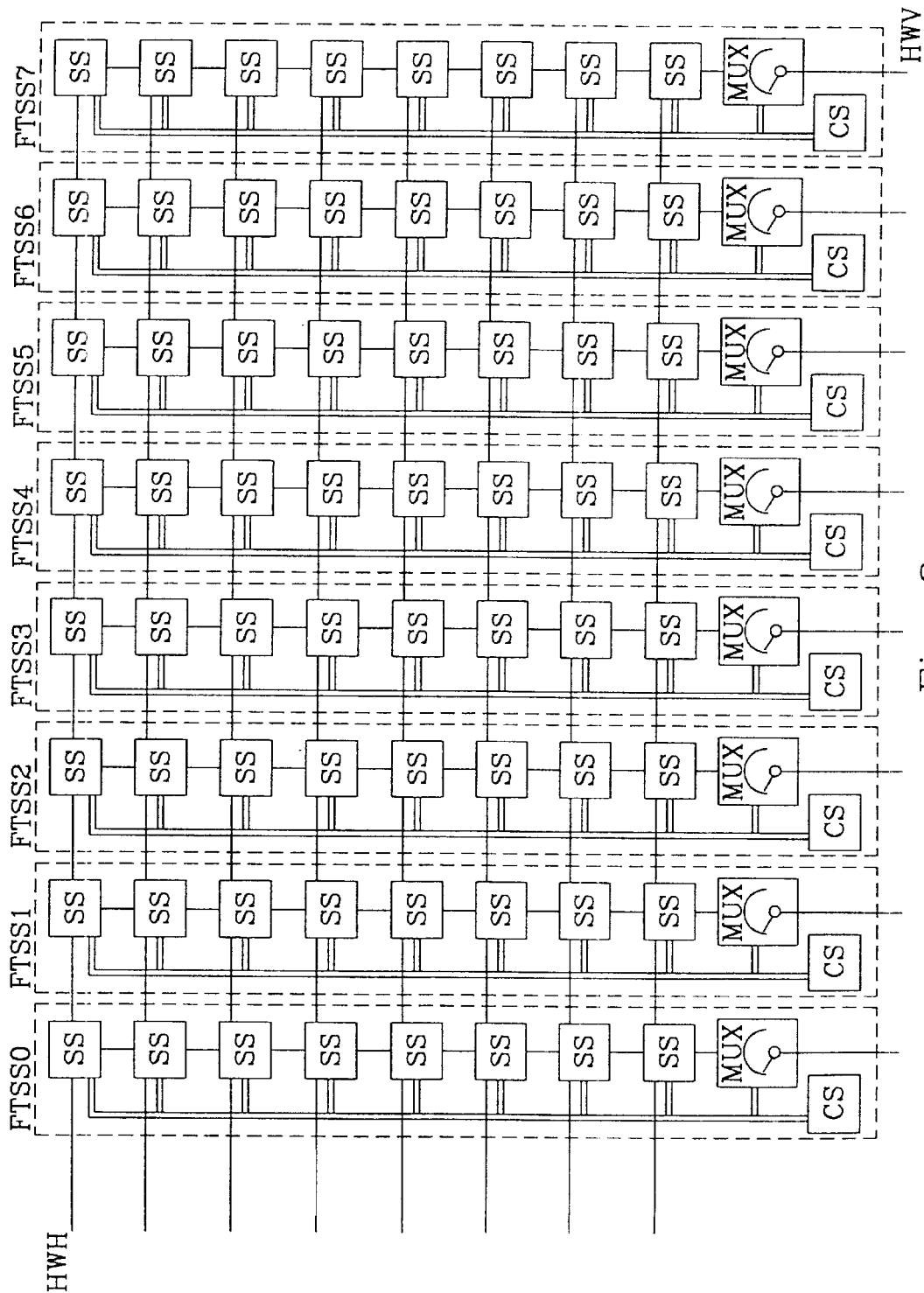
FIG. 8 is a schematic diagram similar to that of FIG. 1 illustrating a TS-switch module which is divided into a number of fractional TS-switch modules.

FIG. 8 is a schematic diagram similar to that of FIG. 1 illustrating a TS-switch module which is divided into a number of fractional TS-switch modules FTSS0 to FTSS7. As mentioned earlier, in the second embodiment of the invention, the switching functionality that corresponds to a given diagonal TS-switch module is divided into fractional TS-switch modules which are incorporated into the switch adapter boards of a given group of switch adapter boards. Each fractional TS-switch module that was formerly located in a diagonal TS-switch module is now relocated into a respective switch adapter board in the given group of switch adapters. As an example, it can be seen from FIGS. 7 and 8 that the fractional TS-switch module FTSS0 is relocated into the switch adapter board SAB0, that FTSS1 is relocated into SAB1, and that FTSS7 is relocated into SAB7. Hence, the fractional TS-switch modules FTSS0–FTSS7 of the switch adapter boards SAB0–SAB7 in the switch adapter board group illustrated in FIG. 7 together correspond to a complete TS-switch module XMB which would be operable for receiving data from the switch adapter boards SAB in the group and also for providing data to the switch adapter boards SAB in the same group.

Of course, the relocation of TS-module switching functionality into switch adapter boards is performed for all diagonal TS-modules. However, it should be understood that the TS-switch modules from which switching functionality is relocated into groups of switch adapter boards do not necessarily have to be diagonal TS-modules. Instead, the requirement is that, for each group of switch adapter boards, the fractional time-space switching functionalities of the group of switch adapter boards together constitute a time-space switching functionality that is a) operable for performing time-space switching of data within the group of switch adapter boards, and b) cooperative with the space switching functionality of the group of switch adapter boards such that the space switching functionality selectively outputs data switched by the time-space switching functionality.

Writing Control Information to the Switch Structure

As mentioned above, a point-to-point connection is generally established under the control of a control system or a control unit which sets the appropriate control stores in the switch structure so as to create a circuit between a predetermined input multiple position and a predetermined output multiple position. Since, the space-switching functionality of the inventive switch structure generally is divided between the TS-modules and the switch adapter boards there are control stores in the TS-modules as well as in the switch adapter boards. This means that for each connection, the control system has to provide control information to the control store in a predetermined switch adapter board as well as to a predetermined control store in the associated TS-module. The normal procedure is to let the traffic control software in the control system interface both control stores.

According to the invention, the writing of control information into the control stores is solved in a more efficient manner. This solution will now be described with reference to FIG. 9.

Figure 9:
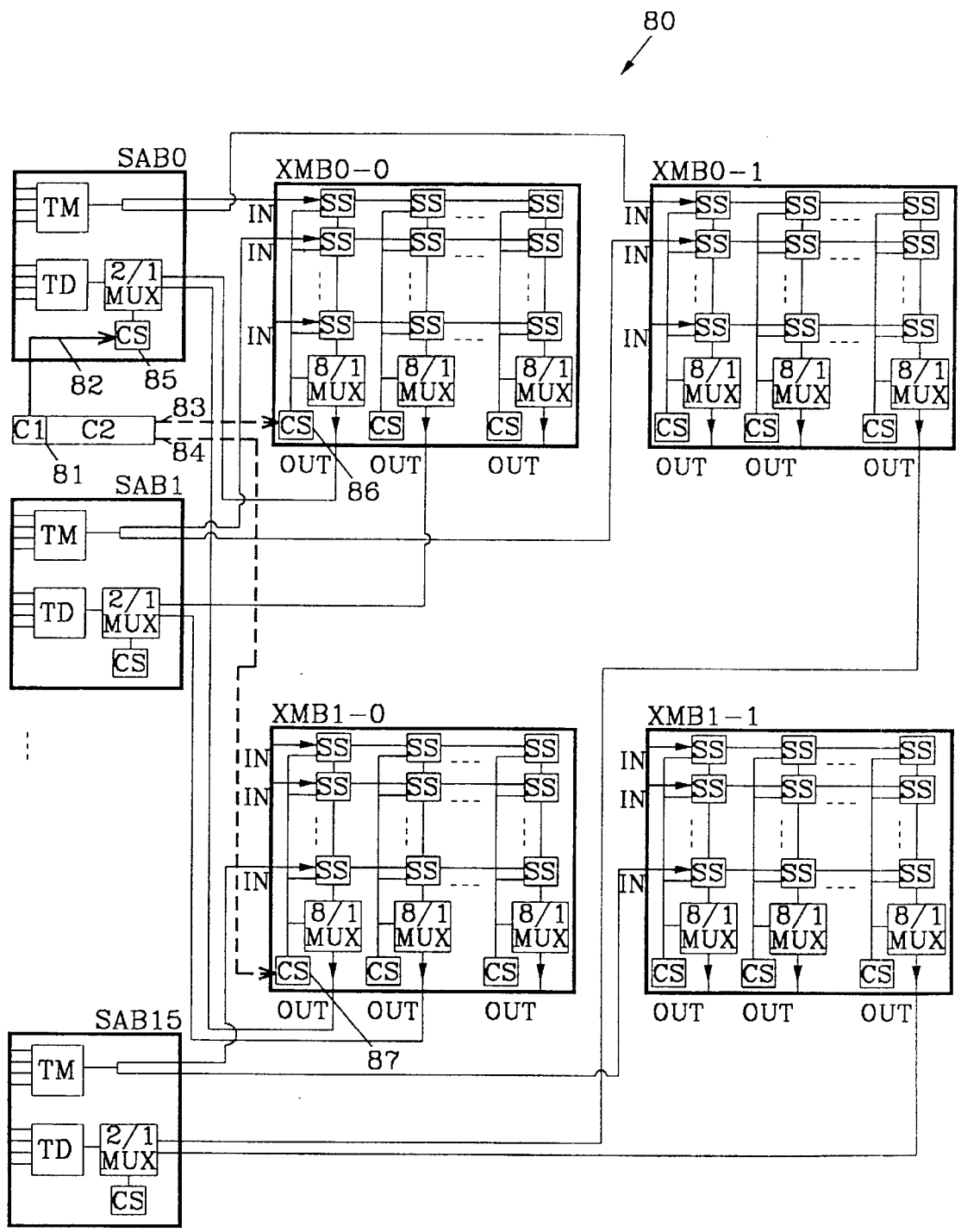
FIG. 9 is a schematic diagram of an example of a switch structure with a 2×2 matrix of TS-modules in which equipment for writing control information is provided.

FIG. 9 is a schematic diagram of an example of a switch structure with a 2×2 matrix of TS-modules. The switch structure 80 illustrated in FIG. 9 is similar to the switch structure 30 shown in FIG. 3. However, in FIG. 9, equipment for providing control information to the control stores according to the invention is indicated. For reasons of simplicity, only those parts of the switch structure 80 that are pertinent to the control information aspect of the invention will be described in the following. According to the present invention, for each point-to-point connection, the traffic control software in the control system (not shown) writes control information that establishes a complete point-to-point connection, into a single writing point such as a register. From this point, control information is then provided to the relevant control stores through hardware links. Hence, the switch structure 80 further comprises a number of registers 81 and associated hardware links 82, 83, 84. Each register 81 is associated with a respective switch adapter board. For simplicity, only a single register 81 and a single set of hardware links 82, 83, 84 are indicated in FIG. 9. The register 81 is operative to receive control information which includes a first control code C1 and a second control code C2. The first control code C1 relates to the control store 85 in the switch adapter board SAB0, and the second control code C2 relates to the control store 86/87 in one of the associated TS-modules XMB0-0 and XMB1-0. The hardware link 82 connects the register 81 to the control store 85 in the switch adapter board SAB0. The hardware links 83 and 84 are selectively activated and connects the register 81 to the control stores 86 and 87, respectively. The first control code C1 is provided to the control store 85 through the hardware link 82. This first control code C1 controls the multiplexor 2/1 MUX associated with the control store 85, but also controls which one of the hardware links 83 and 84 that is to be activated. Next, the second control code C2 is provided on the activated hardware link 83/84 to the corresponding control store 86/87. Preferably, each register 81 is arranged on its associated switch adapter board According to the invention, there is generally no need to change the traffic control software for the inventive switch structure compared to the traffic control software for a conventional non-modular TS-switch core. This will be explained below with reference to an illustrative example.

First, assume that each input line to the TS-modules XMB handles 8192 time slots, and that each speech store SS and control store CS in the TS-modules has 8192 positions, such that the overall switch structure 80 has a capacity of 128 K and capable of handling 131072 time slots numbered from 0 to 131071.

As a first example, if the incoming time slot 65535 of the overall switch 80 is to be retrieved by SAB0, the control system software writes the time slot number 65535, in the form of the binary code 0_1111_1111_1111_1111, into the register 81 associated with SAB0. In this example, the first control code C1 is the most significant bit, a "0", and the second control code C2 includes the remaining bits of the time slot number. The first control code C1 is provided to the control store 85 in the switch adapter board SAB0 through the hardware link 82, and controls the multiplexor 2/1 MUX associated with the control store 85. In this example, a "0" means that the multiplexor 2/1 MUX is set to be in contact with the first output of the TS-module XMB0-0. The first control code C1 also activates one of the hardware links 83 and 84. In this example, a "0" means that the hardware link 83 is activated. Hence, the second control code C2 is provided to the control store 86 in the TS-module XMB0-0 and the incoming time slot of the TS-module XMB0-0 that corresponds to the control code C2, i.e. time slot 65535, is retrieved from the first output of the TS-module XMB0-0.

As a second example, if the incoming time slot 131071 of the overall switch 80 is to be retrieved by SAB0, the control system software writes the time slot number 131071, in the form of the binary code 1_1111_1111_1111_1111, into the register 81 associated with SAB0. The first control code C1 is the most significant bit, now a "1", and the second control code C2 includes the remaining bits of the time slot number. Since C1 is equal to a "1", the multiplexor 2/1 MUX associated with control store 85 is set to be in contact with the first output of the other TS-module XMB1-0. Now, the first control code C1, "1", activates the hardware link 84, and the second control code C2 is provided to the control store 87 in the TS-module XMB0-1. Consequently, the incoming time slot of the TS-module XMB1-0 that corresponds to the binary control code C2, i.e. time slot 65535 in XMB1-0, is retrieved from the first output of the TS-module XMB1-0.

It is of course necessary to provide address information which decides to which outgoing time slot the retrieved incoming time slot is to be switched. The address information determines the storage positions in the control stores 85 and 86/87 into which the control codes C1 and C2, respectively, are written. Preferably, conventional write logic receives the control code and address code in question and performs the actual writing of the control code into the corresponding control store according to the associated address code.

The traffic control software just writes the control information associated with a given point-to-point connection to a single point in the same manner as in an equivalent conventional TS-switch core. In this way, the traffic control software need not be concerned about the internal hardware configuration of the switch structure, and traffic control software already developed for conventional TS-switch cores can be used.

In a larger matrix of TS-modules, the first control code will naturally include more than a single bit.

Subrate Switching

In for example digital mobile telephony, speech information is normally coded by a speech coder in such a way that a lower bit transfer rate is obtained. The basic principle in speech coding is to make the finally decoded signal sound as good as possible at the lowest possible bit rate. In, for instance, the GSM system, full rate transmission is normally performed at a bit rate of 13.0 kbitps, whereas full rate transmission in the D-AMPS system is performed at 7.95 kbitps. Hence, traffic between mobile telephones and base station controllers is generally performed at a relatively low bit rate such as for instance 13.0 kbitps. However, traffic between the base station controllers and mobile switching centers often utilizes the normal public transmission network which operates at a higher bit rate such as 64.0 kbitps. If the base station controllers would switch 13.0 kbitps GSM traffic directly onto a 64.0 kbitps transmission network, a lot of bandwidth capacity would be wasted. In this case, each channel would occupy only one fourth of the bit positions of a time slot. However, by circuit switching this traffic on bit level instead of word level, it is possible to fully utilize the bandwidth capacity offered by the normal public transmission network.

According to the prior art, this is normally solved by using an external bit oriented switch, also referred to as a subrate switch, connected in series with the ordinary switch such that two different switches are operated to set up the connections. The prior art solution has a number of obvious drawbacks. First of all, the input and output terminals of the ordinary switch that are connected to the subrate switch can not be used for normal traffic. Second, the traffic to be switched in the subrate switch first has to be switched through the ordinary switch into the subrate switch and then back to the ordinary switch again, before being switched out therefrom. This naturally leads to substantial delays of the traffic.

However, by using the modular TS-switch structure according to the second embodiment of the invention as a basis, subrate switching is efficiently integrated into the main switch structure. This will be explained below with reference to FIG. 10.

Figure 10:
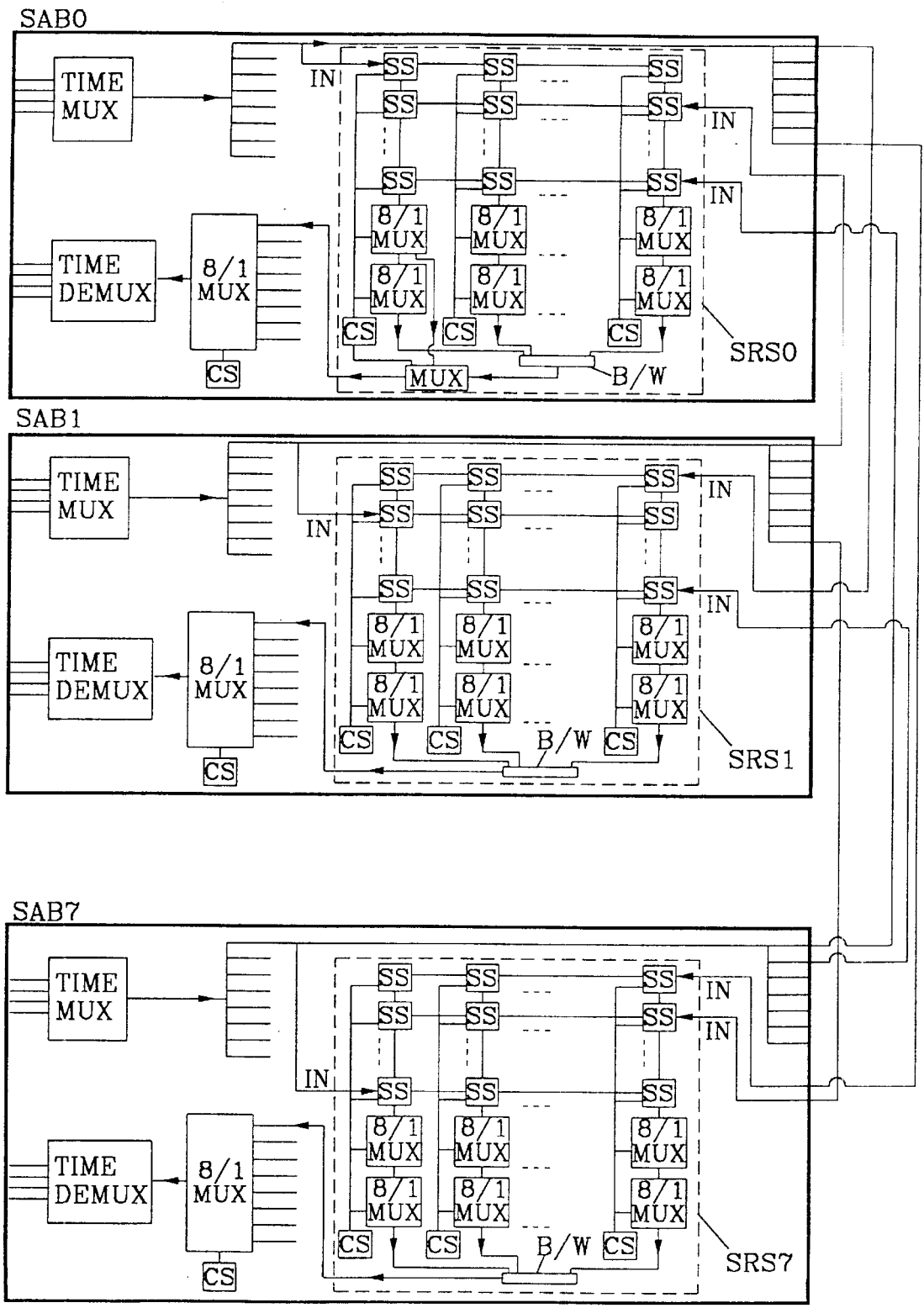
FIG. 10 is a schematic diagram illustrating an example of a group of switch adapter boards according to the invention in which each switch adapter board includes a complete TS-module modified to enable switching on bit level.

FIG. 10 is a schematic diagram similar to that of FIG. 7, illustrating an example of a group of switch adapter boards according to the invention. The main difference between the diagram of FIG. 7 and that of FIG. 10 is that instead of a fractional TS-module, a complete TS-module is provided in each switch adapter board to enable switching on bit level. The TS-modules incorporated into the switch adapter boards SAB0 to SAB7 are modified to operate as bit-oriented subrate switch modules SRS0 to SRS7. Switching on bit level instead of word level also requires an additional multiplexor 8/1 MUX connected in series with each one of the 8/1 MUXs that are needed for word oriented switching. This of course means that each control store CS in the subrate switch module SRS is associated with two multiplexors 8/1 MUX instead of just one, and that the control store CS includes additional control information for controlling the additional multiplexor. Each additional multiplexor 8/1 MUX outputs a single selected bit, and the output bits from all additional multiplexors in a subrate switch module SRS are combined into a data word by a bits-to-word converter B/W.

In general, a bit-oriented time-space switch unit performs a controlled change of bit position and time slot word of selected bits in the received time slot words.

In the subrate switch module SRS0 in the switch adapter board SAB0, word oriented switching and bit oriented switching are truly integrated. The switch module SRS0 includes a further multiplexor MUX which is connected to the output terminal of the bits-to-word converter B/W and to a second output terminal of the first 8/1 MUX in the first speech store column, to receive normally switched data words from the first 8/1 MUX and subrate switched data words from the bits-to-word converter B/W. The control store CS associated with the first speech store column is also connected to the MUX, and includes further control information which controls the selection of data from the MUX. If the MUX is controlled to select data from the second output terminal of the first 8/1 MUX in the first speech store column, word oriented switching is performed, whereas if the MUX is controlled to select data from the bits-to-word converter B/W, then bit oriented switching is performed.

However, since switching of words can be performed on word level as well as on bit level, it is also possible to perform the switching only by using the output of the bits-to-word converter B/W, as illustrated in the subrate switch modules SRS1 and SRS7 in the switch adapter boards SAB1 and SAB7. Anyway, the output terminal of the subrate switch module SRS is connected on the Local Highway Vertical to the switch adapter board selector in the same manner as described in connection with FIG. 7. In all other aspects, the overall switch structure is similar to that described in connection with FIG. 6 and 7.

In this way, full subrate switching is efficiently provided within a given group of switch adapter boards, whereas normal switching is provided between different groups of switch adapter boards.

It should be understood that the switch adapter board SAB0 of FIG. 10 itself constitutes a TS-switch in which word oriented and bit oriented switching are integrated, whereas each of the switch adapter boards SAB1 to SAB7 constitutes a bit oriented TS-switch. It is possible to combine several switch adapter boards of the same type as SAB0 to form a group of switch adapter boards, in the same way as illustrated in FIG. 10, within which integrated full subrate switching is obtained. It is also possible to combine several switch adapter boards of the same type as SAB1 to form a group of switch adapter boards.

Another solution according to the invention is to connect a subrate switch "in parallel" with a TS-switch. In this way, all switch terminals of the TS-switch unit can be used for normal traffic, and the delay of the subrate switched traffic is reduced compared to the delay according to the prior art solution which utilizes an ordinary switch connected in series with a subrate switch. This solution will be described below with reference to FIG. 11.

Figure 11:
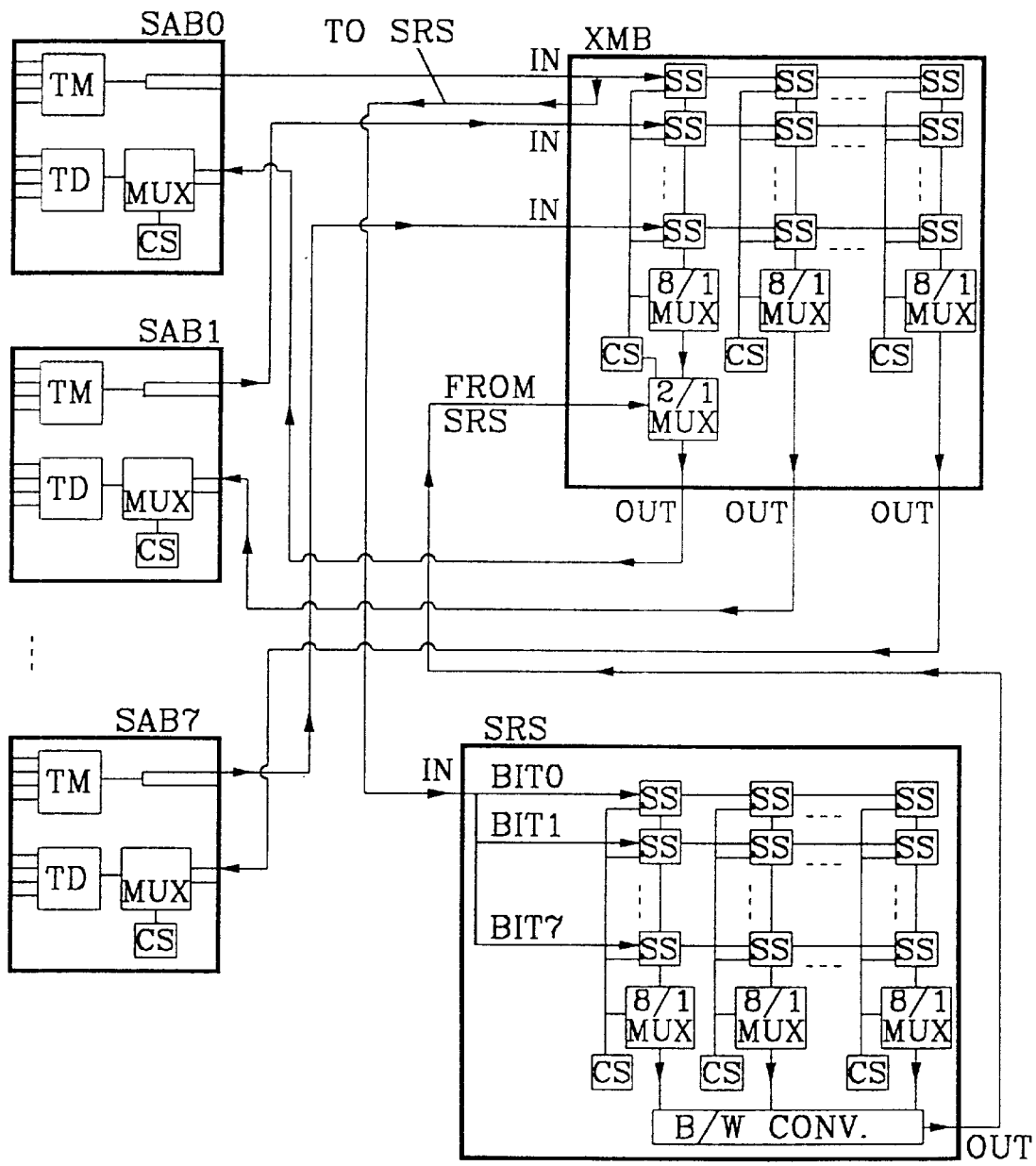
FIG. 11 is a schematic diagram illustrating a switch structure according to the invention, in which a subrate switch is connected in parallel with a TS-switch module.

FIG. 11 is a schematic diagram illustrating a switch structure with a subrate switch connected in parallel with a TS-switch module. The switch structure includes a TS-module XMB, an associated group of switch adapter boards SAB0 to SAB7 and a subrate switch module SRS connected in parallel with the TS-module XMB. The TS-module XMB co-operates with the switch adapter boards SAB0 to SAB7 in substantially the same manner as described above in connection with FIG. 3. However, since there is only a single TS-module, the switch adapter boards are transparent with respect to switching functionality and are therefore disregarded at this point. The subrate switch module SRS is similar to the TS-module when it comes to the overall hardware configuration. The subrate switch SRS comprises a matrix of speech stores SS, and associated multiplexors and control stores. However, the speech stores SS in the subrate switch SRS are prepared to store bits instead of entire words in the storage positions. The subrate switch SRS is further equipped with an input terminal IN and an output terminal OUT. The time slots that are provided to a predetermined input terminal of the TS-module XMB is also distributed to the input terminal IN of the subrate switch SRS such that the subrate switch SRS is continuously supplied with time slots. In the subrate switch SRS, the data words in the received time slots are disassembled to bit level such that each data word is divided into a number of bits BIT0 to BIT7. Each bit is then distributed to a respective row of speech stores in the subrate switch SRS, and stored in all speech stores SS of that row. The multiplexors 8/1 MUXs controlled by the associated control stores CS are operative to output selected bits from the speech stores. The selected output bits of the multiplexors 8/1 MUX in the subrate switch SRS are combined in a bits-to-word converter into an entire word which is sent to the TS-module XMB.

The TS-module XMB further comprises an additional input terminal for receiving the data from the subrate switch SRS. The additional input terminal is connected to an additional 2/1 MUX which also receives data from a predetermined 8/1 MUX in the TS-module XMB. The control store CS associated with this predetermined 8/1 MUX is also connected to the additional 2/1 MUX, and holds additional control information for controlling the 2/1 MUX. If the 2/1 MUX is set to receive the output from the subrate switch SRS, the TS-module supports subrate switching, whereas if the 2/1 MUX is set to receive data from the associated 8/1 MUX in the TS-module, then the TS-module supports normal word oriented switching. In this way, subrate switching as well as normal switching are supported. Assuming that each TS-module has a capacity of 64 K, the subrate switch SRS has a capacity of 8 K.

A larger modular TS-switch structure which supports normal word oriented switching as well as subrate switching is obtained based on the switch structure according to the first embodiment of the invention by connecting a subrate switch in parallel with each one of the TS-modules in modular switch structure. This is schematically illustrated in FIG. 12.

Figure 12:
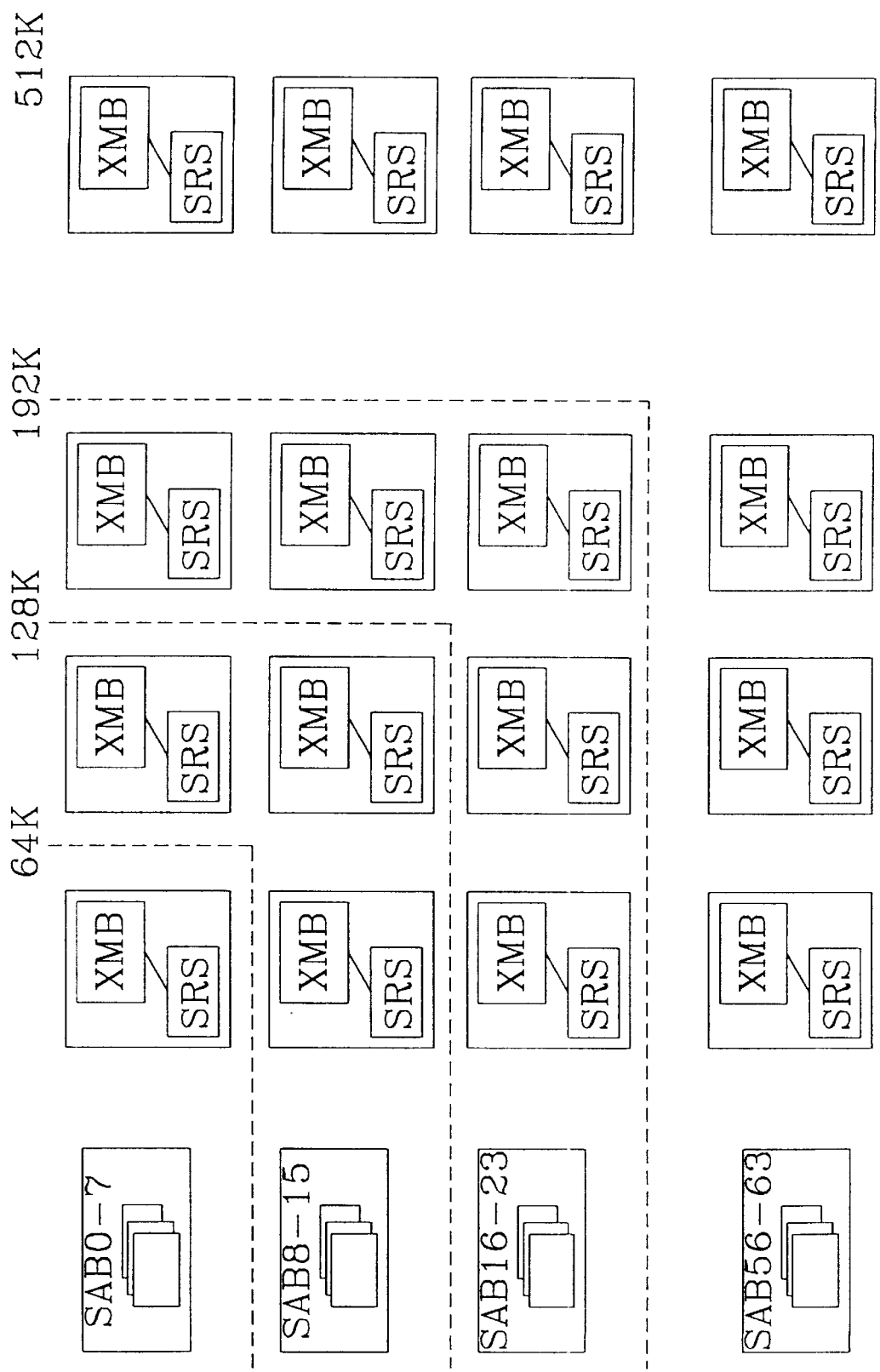
FIG. 12 is a schematic diagram illustrating the principle of designing different size switch structures that support normal word oriented switching as well as subrate switching.

FIG. 12 is a schematic diagram illustrating the principle of designing different size switch structures that support normal switching as well as subrate switching. The diagram of FIG. 12 is similar to that of FIG. 4. However, the different switch structures of FIG. 12 are based on switch adapter boards SAB, and aggregates of TS-modules XMB and subrate switch modules SRS. These switch structures will have full subrate switching, supported by the associated subrate switch modules SRS, for one switch adapter board in each group of switch adapter boards.

Figure 13:
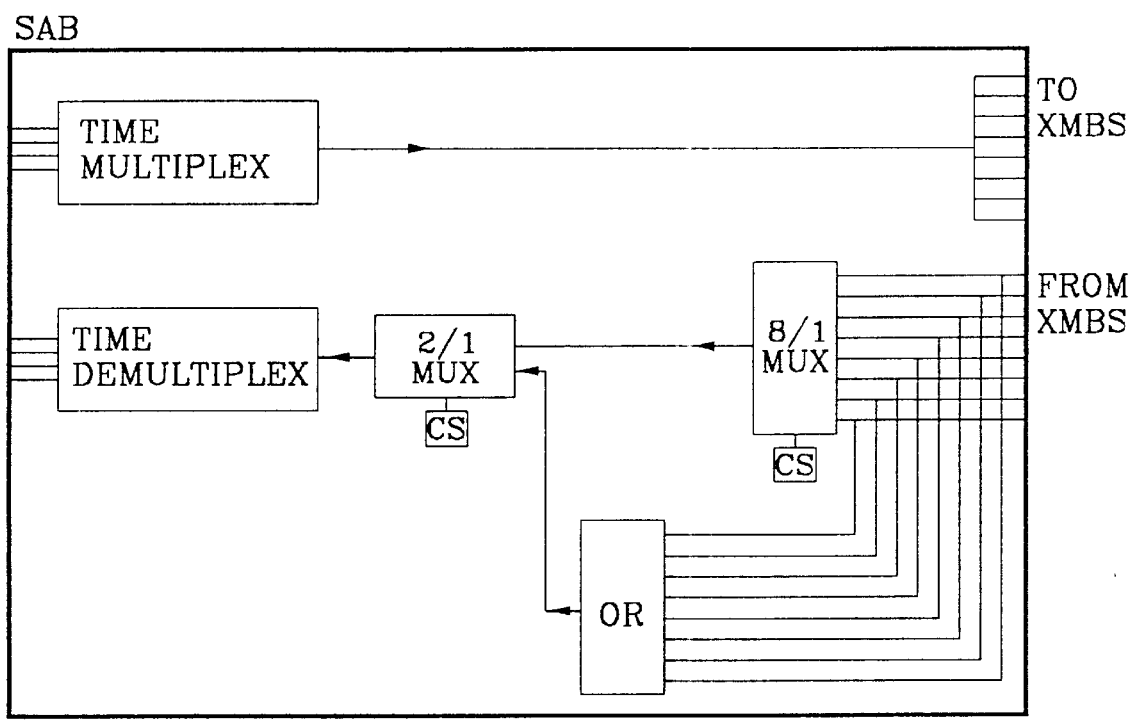
FIG. 13 is a schematic diagram of pertinent parts of a switch adapter board which is associated with full subrate switching capability.

The switch structures of FIG. 12 are further modified compared to the switch structure described with reference to FIGS. 2 to 4, by letting each subrate switch module SRS set the output bits that are not associated with currently established connections to "0", and by providing each switch adapter board SAB which is operative to selectively receive data words that originate from subrate switch modules SRS, with an OR-gate which receives data from the TS-modules XMB in the associated TS-module column. FIG. 13 is a schematic diagram of pertinent parts of a switch adapter board SAB which is associated with full subrate switching capability. The switch adapter board selector 8/1 MUX receives data from the TS-modules in the associated column, and the same data is distributed to an OR-gate, which performs a bit-wise OR-operation on the received data. The output terminal of the OR-gate in the switch adapter board SAB is connected to an additional controllable 2/1 MUX which also receives the output from the selector 8/1 MUX. For subrate switching, when the output data of the subrate switch modules SRS are sent to the switch adapter boards through the 2/1 MUX in the TS-modules, the result of the OR-operation is forwarded to the time demultiplexer by the 2/1 MUX in the switch adapter board SAB. Since output bits that are not associated with established connections are set to "0", the relevant output bits will pass through the OR-gate. In this way, subrate switching for modular switch structures is successfully implemented.

Further information on switching, switch control and signalling procedures in switches can be found in for instance the documentation of the AXE system from Telefonaktiebolaget L M Ericsson.

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed herein are within the scope and spirit of the invention.

What is claimed is:

1. A switch structure for circuit switching data, said switch structure comprising:
   a number of time-space switch modules which are arrangeable as a matrix with columns and rows of said time-space switch modules; and
   a number of switch adapter units which are arrangeable in groups, each one of said groups of switch adapter units being associated with the time-space switch modules of a predetermined row of said switch module matrix for inputting data to the time-space switch modules of said row, and with the time-space switch modules of a predetermined column of said switch module matrix for outputting data from the switch modules of said column, and each one of said groups of switch adapter units having a space-switching functionality which is operative in the process of outputting data from the associated time-space switch modules.

2. A switch structure for circuit switching data according to claim 1, wherein each one of said time-space switch modules includes:
   a number of input terminals for receiving data;
   a number of speech stores for storing data, said speech stores being arrangeable as a speech store matrix having columns and rows, each speech store in a predetermined row of said speech store matrix being connected to the same input terminal for enabling all speech stores in said speech store row to receive the same set of data;
   a number of multiplexors, each of which is associated with the speech stores of a respective column of said speech store matrix;
   a number of control stores, each one of said control stores being associated with a respective column of said speech store matrix and with the multiplexor that is associated with the same speech store column, and holding control information that control:
      the read-out of data from each one of the speech stores in the speech store column; and
      from which speech store in said speech store column that data should be retrieved as column output by said multiplexor; and
   a number of output terminals respectively connected to said multiplexors for receiving said column outputs.

3. A switch structure for circuit switching data according to claim 2, wherein each switch adapter unit in a predetermined group of switch adapter units is associated with a predetermined output terminal position of the time-space switch modules in the switch module column associated with said group of switch adapter units and includes a controllable selector which is connected to the switch module output terminals at said output terminal position for receiving column outputs from all switch module output terminals at said position to select one of them as selector output data.

4. A switch structure for circuit switching data according to claim 3, wherein each switch adapter unit includes a control store for storing selector control information, said control store being connected to said controllable selector such that said selector is controllable by said selector control information.

5. A switch structure for circuit switching data according to claim 3, wherein each switch adapter unit further includes a time demultiplexing unit which is responsive to said selector output data from said controllable selector and which has an output interface for at least one outgoing digital link.

6. A switch structure for circuit switching data according to claim 2, wherein each switch adapter unit in a predetermined group of switch adapter units is associated with a predetermined input terminal position of the time-space switch modules in the switch module row associated with said group of switch adapter units, and includes means for distributing data to the switch module input terminals at said input terminal position.

7. A switch structure for circuit switching data according to claim 6, wherein each switch adapter unit further includes:

an input interface for at least one incoming digital link; and a time multiplexing unit for multiplexing data from said at least one incoming digital link into time-multiplexed data, said time-multiplexing unit being connected to said distributing means for sending said time-multiplexed data thereto.

8. A switch structure for circuit switching data according to claim 1, wherein said time-space switch modules operate independently from each other.

9. A switch structure for circuit switching data according to claim 1, wherein each one of said switch adapter units includes a space-switching functionality unit for selecting a reduced set of data from the data obtained from the associated time-space switch modules.

10. A switch structure for circuit switching data according to claim 1, wherein at least one of said time-space switch modules comprises a word-oriented time-space switch unit.

11. A switch structure for circuit switching data according to claim 1, wherein at least one of said time-space switch modules comprises a bit-oriented time-space switch unit.

12. A switch structure for circuit switching data according to claim 1, wherein each one of said switch adapter units is provided on a separate circuit board.

13. A switch structure for circuit switching data according to claim 1, wherein each group of switch adapter units is provided on a separate circuit board.

14. A switch structure for circuit switching data according to claim 1, wherein each time-space switch module is provided on a separate circuit board.

15. A switch structure for circuit switching data according to claim 1, wherein each group of switch adapter units and its associated column of time-space switch modules are provided in a separate subrack.

16. A switch structure for circuit switching data, said switch structure comprising:

a number of time-space switch modules which are arrangeable as a matrix with columns and rows of said time-space switch modules each one of said time-space switch modules having input terminals for receiving data, means for time-space switching data and output terminals for outputting data; and a number of switch adapter units which are arrangeable in groups, each one of said groups of switch adapter units being associated with the time-space switch modules of a predetermined row of said matrix for inputting data to the time-space switch modules of said row, and with the time-space switch modules of a predetermined column of said matrix for outputting data from the switch modules of said column;

each switch adapter unit of a group of switch adapter units being associated with a predetermined input terminal position of the time-space switch modules in the row associated with said group of switch adapter units and with a predetermined output terminal position of the time-space switch modules in the column associated with said group of switch adapter units, and including means for distributing data to the switch module input terminals at said input terminal position, and a controllable selector connected to the switch module output terminals at said output terminal position for receiving data from all output terminals at said position to select data from one of said output terminals as selector output data, the input terminal of said distributing means acting as input interface of the switch adapter unit, and the output terminal of said selector acting as output interface of the switch adapter unit.

17. A switch structure for circuit switching data, said switch structure comprising:

a number of time-space switch modules which are arrangeable as a matrix, said matrix having columns and rows of said time-space switch modules; and a number of switch adapter units which are arrangeable in groups, each one of said groups of switch adapter units being associated with the time-space switch modules of a predetermined row of said matrix for inputting data to the time-space switch modules of said row, and with the time-space switch modules of a predetermined column of said matrix for outputting data from the switch modules of said column, each one of said groups of switch adapter units having a space-switching functionality which is operative in the process of outputting data from the associated time-space switch modules;

each time-space switch module in said matrix being operable for receiving data from a predetermined group of switch adapter units and for providing data to another predetermined group of switch adapter units;

each switch adapter unit further including a fractional time-space switching functionality, and, for each group of switch adapter units, the fractional time-space switching functionalities of the group of switch adapter units together constituting a time-space switching functionality that is operable for performing time-space switching of data within the group of switch adapter units and cooperative with the space switching functionality of the group of switch adapter units such that said space switching functionality selectively outputs data switched by said time-space switching functionality.

18. A switch structure for circuit switching data according to claim 17, wherein the fractional time-space switching functionality of at least one of said switch adapter boards is bit-oriented.

19. A switch structure for circuit switching data according to claim 18, wherein said fractional time-space switching functionality is in the form of a bit-oriented time-space switch unit which, in operation, performs a controlled change of bit position and time slot word of selected bits in time slot words received as data by said bit-oriented time-space switch unit.

20. A switch structure for circuit switching data according to claim 17, wherein the fractional time-space switching functionality of a least one of said switch adapter boards is operable for alternately performing word-oriented switching and bit-oriented switching.

21. A switch structure for circuit switching data according to claim 17, wherein the time-space switching functionality of at least one of said groups of switch adapter boards is bit-oriented.

22. A switch structure for circuit switching data according to claim 17, wherein each one of said time-space switch modules in said matrix has input terminals for receiving data, first means for time-space switching data and output terminals for outputting data, and said fractional time-space switching functionality is in the form of a fractional time-space switch unit which has input terminals, second means for time-space switching data and at least one output terminal, each switch adapter unit of a group of switch adapter units being associated with a predetermined input terminal position of the time-space switch modules in the row associated with said group of switch adapter units and with the input terminals of the fractional time-space switch units of the switch adapter units that belong to said group of switch adapter boards at said input terminal position, and also with a predetermined output terminal position of the time-space switch modules in the column associated with said group of switch adapter units, and including means for distributing data to the switch module input terminals at said input terminal position and to the fractional switch unit input terminals at said input terminal position, and a controllable selector connected to the switch module output terminals at said output terminal position and the output terminal of the fractional time-space switch unit in said switch adapter unit for receiving data from said output terminals to select one of them as selector output data.

23. A communication switch for circuit switching of data, said switch comprising:

a switch structure which includes:

a number of time-space switch modules which are arrangeable as a matrix with columns and rows of said time-space switch modules; and a number of switch adapter units which are arrangeable in groups, each one of said groups of switch adapter units being associated with the time-space switch modules of a predetermined row of said switch module matrix for inputting data to the time-space switch modules of said row, and with the time-space switch modules of a predetermined column of said switch module matrix for outputting data from the switch modules of said column, each one of said groups of switch adapter units having a space-switching functionality which is operative in the process of outputting data from the associated time-space switch modules said switch adapter units being operative for acting as input interface and output interface of said switch;

a clock signal and synchronization signal generating system for providing clock signals and synchronization signals to the switch structure; and a control unit for controlling the switching operations of the switch structure.

* * * * *